United States Patent
Fourrier et al.

(10) Patent No.: US 12,488,343 B2
(45) Date of Patent: *Dec. 2, 2025

(54) INTEROPERABLE COMPOSITE DATA UNITS FOR USE IN DISTRIBUTED COMPUTING EXECUTION ENVIRONMENTS

(71) Applicant: Futureverse Corporation Limited, Auckland (NZ)

(72) Inventors: Nicolas Fourrier, Auckland (NZ); Erin Zink, Phoenix, AZ (US); David McDonald, Auckland (NZ); Aaron McDonald, Auckland (NZ)

(73) Assignee: Futureverse Corporation Limited, Auckland (NZ)

( * ) Notice: Subject to any disclaimer, the term of this patent is extended or adjusted under 35 U.S.C. 154(b) by 208 days.

This patent is subject to a terminal disclaimer.

(21) Appl. No.: 18/240,319

(22) Filed: Aug. 30, 2023

(65) Prior Publication Data

US 2023/0410107 A1   Dec. 21, 2023

Related U.S. Application Data

(63) Continuation-in-part of application No. 18/107,804, filed on Feb. 9, 2023, now Pat. No. 12,306,846, which
(Continued)

(51) Int. Cl.
*G06F 8/35* (2018.01)
*A63F 13/77* (2014.01)
(Continued)

(52) U.S. Cl.
CPC ......... *G06Q 20/401* (2013.01); *G06Q 20/389* (2013.01)

(58) Field of Classification Search
CPC ............ G06F 8/35; A63F 13/77; G06N 20/00
(Continued)

(56) References Cited

U.S. PATENT DOCUMENTS 5,402,526 A * 3/1995 Bauman ................. G06N 5/043
706/45
7,912,560 B2   3/2011 Hood et al.
(Continued)

FOREIGN PATENT DOCUMENTS

CA           3150262 A1    3/2021
CN         107169573 A     9/2017
(Continued)

OTHER PUBLICATIONS

Talib, Manar Abu, et al. "A systematic literature review on hardware implementation of artificial intelligence algorithms." The Journal of Supercomputing 77.2 (2021): pp. 1897-1938. (Year: 2021).*
(Continued)

*Primary Examiner* — Satish Rampuria
(74) *Attorney, Agent, or Firm* — Potomac Law Group, PLLC; Marc S. Kaufman

(57) ABSTRACT

Disclosed implementations provide executable data, such as artificial intelligence models that can be owned, traded, and used in various execution environments. By coupling a model with a strictly defined interface definition, the model can be executed in various execution environments that support the interface. Coupling the model with a non-fungible cryptographic token allows the model and other components to be owned and traded as a unit. The tradeable composite units have utility across multiple supported execution environments, such as video game environments, chat bot environments and financial trading environments. Additionally, the interface allows for the creation of pipelines and systems from multiple complementary composite units that can be used to train other models and composite units.

6 Claims, 17 Drawing Sheets

Related U.S. Application Data is a continuation-in-part of application No. 17/353,898, filed on Jun. 22, 2021, now Pat. No. 11,797,274.

(51) Int. Cl.

| | | |
|---|---|---|
| *G06F 8/41* | (2018.01) | |
| *G06F 16/22* | (2019.01) | |
| *G06F 16/25* | (2019.01) | |
| *G06N 20/00* | (2019.01) | |
| *G06Q 20/38* | (2012.01) | |
| *G06Q 20/40* | (2012.01) | |
| *H04L 9/00* | (2022.01) | |
| *H04L 9/32* | (2006.01) | |

(58) Field of Classification Search
USPC .............................. 717/100–124; 705/42–44
See application file for complete search history.

(56) References Cited

U.S. PATENT DOCUMENTS

| | | | |
|---|---|---|---|
| 9,364,759 | B2 | 6/2016 | Kim |
| 10,621,013 | B2 | 4/2020 | Lavoie et al. |
| 10,748,072 | B1 | 8/2020 | Seeger et al. |
| 10,776,686 | B1 | 9/2020 | Jacob et al. |
| 10,902,320 | B2 | 1/2021 | Katz et al. |
| 10,946,283 | B1 | 3/2021 | Meilich et al. |
| 11,052,316 | B2 | 7/2021 | Wang et al. |
| 11,164,109 | B2 | 11/2021 | Browne et al. |
| 11,244,313 | B2 | 2/2022 | Padmanabhan et al. |
| 11,276,014 | B2 | 3/2022 | Augustine et al. |
| 11,288,280 | B2 | 3/2022 | Padmanabhan et al. |
| 11,314,729 | B2 | 4/2022 | Saito |
| 11,361,228 | B2 * | 6/2022 | Ackerman .............. G06F 21/64 |
| 11,374,755 | B1 | 6/2022 | Gaur et al. |
| 11,429,762 | B2 | 8/2022 | Mallya Kasaragod et al. |
| 11,431,486 | B2 | 8/2022 | Padmanabhan |
| 11,431,693 | B2 | 8/2022 | Padmanabhan |
| 11,496,308 | B1 | 11/2022 | Khan |
| 11,679,330 | B2 | 6/2023 | Eatedali et al. |
| 11,710,027 | B2 | 7/2023 | Zhu et al. |
| 11,776,060 | B2 * | 10/2023 | Briancon .............. G06F 18/214 706/20 |
| 11,836,640 | B2 | 12/2023 | Ji et al. |
| 11,853,724 | B2 | 12/2023 | Hunter |
| 11,868,896 | B2 | 1/2024 | Brown et al. |
| 11,876,910 | B2 | 1/2024 | Padmanabhan |
| 11,880,349 | B2 | 1/2024 | Padmanabhan |
| 11,991,299 | B1 | 5/2024 | Rosenoer |
| 12,008,472 | B2 | 6/2024 | Cook |
| 12,106,303 | B2 * | 10/2024 | Thaw ........................ H04L 9/50 |
| 12,165,118 | B2 | 12/2024 | Yantis et al. |
| 2002/0048369 | A1 | 4/2002 | Ginter et al. |
| 2004/0205772 | A1 * | 10/2004 | Uszok ...................... H04L 67/34 709/202 |
| 2013/0081005 | A1 | 3/2013 | Gounares et al. |
| 2015/0310423 | A1 | 10/2015 | Desai et al. |
| 2016/0188622 | A1 | 6/2016 | Sharangpani |
| 2017/0147742 | A1 | 5/2017 | Jayaraman et al. |
| 2018/0293838 | A1 | 10/2018 | Arnone et al. |
| 2018/0314942 | A1 | 11/2018 | Shinn et al. |
| 2018/0357047 | A1 | 12/2018 | Brown et al. |
| 2019/0197402 | A1 | 6/2019 | Kovács et al. |
| 2019/0205773 | A1 * | 7/2019 | Ackerman ............ G06F 16/288 |
| 2019/0232172 | A1 | 8/2019 | Malan |
| 2019/0236562 | A1 | 8/2019 | Padmanabhan |
| 2019/0299105 | A1 | 10/2019 | Knight et al. |
| 2019/0354759 | A1 | 11/2019 | Somers et al. |
| 2019/0385136 | A1 | 12/2019 | Blagov et al. |
| 2020/0169546 | A1 | 5/2020 | Padmanabhan |
| 2020/0184041 | A1 | 6/2020 | Andon et al. |
| 2020/0219093 | A1 | 7/2020 | Malhotra et al. |
| 2020/0250174 | A1 | 8/2020 | Padmanabhan et al. |
| 2020/0252404 | A1 | 8/2020 | Padmanabhan |
| 2020/0349142 | A1 | 11/2020 | Padmanabhan |
| 2020/0380303 | A1 | 12/2020 | Briancon et al. |
| 2020/0384362 | A1 | 12/2020 | Shah et al. |
| 2021/0067339 | A1 | 3/2021 | Schiatti et al. |
| 2021/0143987 | A1 * | 5/2021 | Xu ........................ H04L 63/062 |
| 2021/0149958 | A1 | 5/2021 | Hunter |
| 2021/0182423 | A1 | 6/2021 | Padmanabhan |
| 2021/0248653 | A1 * | 8/2021 | McKenzie ............ H04L 9/3247 |
| 2021/0357780 | A1 | 11/2021 | Ji et al. |
| 2021/0365840 | A1 | 11/2021 | Park et al. |
| 2022/0076164 | A1 | 3/2022 | Conort et al. |
| 2022/0188810 | A1 | 6/2022 | Doney |
| 2022/0358450 | A1 | 11/2022 | Stephens et al. |
| 2022/0405066 | A1 | 12/2022 | McDonald |
| 2022/0407702 | A1 | 12/2022 | Jakobsson et al. |
| 2023/0267128 | A1 | 8/2023 | Fourrier et al. |
| 2023/0281601 | A9 | 9/2023 | Doney |
| 2023/0308276 | A1 | 9/2023 | Bathen et al. |
| 2023/0385085 | A1 | 11/2023 | Singh |

FOREIGN PATENT DOCUMENTS

| | | |
|---|---|---|
| KR | 20200103275 A | 9/2020 |
| WO | 2021046541 A1 | 3/2021 |
| WO | 2021097259 A1 | 5/2021 |

OTHER PUBLICATIONS

Fernandez, Alberto, et al. "Evolutionary fuzzy systems for explainable artificial intelligence: Why, when, what for, and where to ?." IEEE Computational intelligence magazine 14.1 (2019): pp. 69-81. (Year: 2019).*

Janiesch, Christian, Patrick Zschech, and Kai Heinrich. "Machine learning and deep learning." Electronic markets 31.3 (2021): pp. 685-695. (Year: 2021).*

Netto, Marco AS, et al. "HPC cloud for scientific and business applications: taxonomy, vision, and research challenges." ACM Computing Surveys (CSUR) 51.1 (2018): pp. 1-29. (Year: 2018).*

Russell, Stephen, Ira S. Moskowitz, and Adrienne Raglin. "Human information interaction, artificial intelligence, and errors." Autonomy and artificial intelligence: a threat or savior ?. Cham: Springer International Publishing, 2017. pp. 71-101. (Year: 2017).*

Huebscher, Markus C., and Julie A. McCann. "A survey of autonomic computing-degrees, models, and applications." ACM Computing Surveys (CSUR) 40.3 (2008): pp. 1-28. (Year: 2008).*

"AI Protocol History. Evolution of the AI Protocol"; AI Protocol Whitepaper; downloaded from https://docs.aiprotocol.info/ai-protocol-history, pp. 1-2.

Andersson, Per et al.: "Movie-an interactive environment for silicon compilation tools", IEEE transactions on computer-aided design of integrated circuits and systems 8.6 (1989): pp. 693-701. (Year: 1989).

Andrade, Henrique, et al.: "Optimizing the execution of multiple data analysis queries on parallel and distributed environments", IEEE transactions on parallel and distributed systems 15.6 (2004): pp. 520-532. (Year: 2004).

Babichenko, Dmitriy et al.: "The Use of Agent-Based Models as Non-Player Characters in Serious Games", 2020 IEEE 8th International Conference on Serious Games and Applications for Health (SeGAH). IEEE, 2020.pp. 1-8 (Year: 2020).

Balint, J. Timothy et al.: "Understanding everything NPCs can do: metrics for action similarity in non-player characters", Proceedings of the 13th international conference on the foundations of digital games. 2018.pp. 1-10. (Year: 2018).

Carey, Michael J., et al.: "Shoring up persistent applications", Proceedings of the 1994 ACM SIGMOD international conference on Management of data. 1994.pp.383-394 (Year: 1994).

Chiang, Mung et al.: "Fog and IoT: An overview of research opportunities", IEEE Internet of things journal 3.6 (2016): pp. 854-864. (Year: 2016).

Diaz, Guillermo et al.: "Evolutionary behavioral design of non-player characters in a FPS video game through particle swarm optimization", 2019 13th International Conference on Software,

(56) References Cited

OTHER PUBLICATIONS

Knowledge, Information Management and Applications (SKIMA). IEEE, 2019. pp. 1-8 (Year: 2019).
Dwyer, Matthew B. et al.: "Model checking graphical user interfaces using abstractions", ACM SIGSOFT Software Engineering Notes 22.6 (1997): pp. 244-261. (Year: 1997).
Epperly, Thomas, et al.: "Composite parallelism: Creating interoperability between PGAS languages, HPCS languages and message passing libraries", Technical report LLNL-AR-499171, 2011.pp. 1-31 (Year: 2011).
Etherscan.io; downloaded from https://etherscan.io/address/0xa189121eE045AEAA8DA80b72F7a1132e3B216237#code, pp. 1-6.
Foerster, Jakob N., et al.: "Learning to Communicate with Deep Multi-Agent Reinforcement Learning", arXiv:1605.06676v2 [cs.AI], May 24, 2016.
GitHub—Universe: a software platform for measuring and training an AI's general intelligence across the world's supply of games, websites and other applications. pp. 1-7.
GitHub-openai/gym: A toolkit for developing and comparing reinforcement learning algorithms accessed on Jan. 24, 2025, pp. 1-5. Gym Documentation; 7 pages.
Gymnasium: An API standard for reinforcement learning with a diverse collection of reference environments pp. 1-1.
Hubbold, Roger, et al.: "GNU/MAVERIK: A micro-kernel for large-scale virtual environments", Proceedings of the ACM symposium on Virtual reality software and technology. 1999. pp. 66-73 (Year: 1999).
INFT // To the Young Artists of Cyberspace—Natively Digital—A Curated NFT Sale—2021—Sotheby's.
International Preliminary Report on Patentability issued in PCT Patent Application No. PCT/IB2022/055797, dated Sep. 29, 2022.
International Search Report and Written Opinion issued in PCT Patent Application No. PCT/IB2022/055797, dated Sep. 29, 2022.
International Search Report and Written Opinion issued in PCT Patent Application No. PCT/IB2024/050941, dated Apr. 24, 2024.
International Search Report and Written Opinion issued in PCT Patent Application No. PCT/IB2024/050944, dated Apr. 17, 2024.
International Search Report and Written Opinion issued in PCT Patent Application No. PCT/US24/43724, dated Nov. 5, 2024.
Kundu, Sajib, et al.: "Modeling virtualized applications using machine learning techniques", Proceedings of the 8th ACM SIGPLAN/SIGOPS conference on Virtual Execution Environments. 2012. pp. 3-14 (Year: 2012).
Ledeczi, Akos, et al.: "Composing domain-specific design environments", Computer 34.11 (2001): pp. 44-51. (Year: 2001).
McConaghy, Trent, et al.: "Towards an Ownership Layer for the Internet", Ascribe GMBH, Version 1.03, Jun. 24, 2015.
Mnih, V., et al.: "Human-level control through deep reinforcement learning", Nature, vol. 518, Feb. 26, 2015.
Multi-Agent_AI_DAO, "General-Purpose Decentralized Autonomous Organisation", www.montreal.ai; 20 pages.
Natella, Roberto, et al.: "Analyzing the effects of bugs on software interfaces", IEEE Transactions on Software Engineering 46.3 (2018): pp. 280-301. (Year 2018).
Ngu, Anne HH, et al.: "Semantic-based mashup of composite applications", IEEE Transactions on Services Computing 3.1 (2010): pp. 2-15. (Year: 2010).
Panagou, Eleni et al.: "Towards an open and decentralized case law curation ecosystem", Plos one 15.10 (2020): pp. 1-30. (Year: 2020).
Sekar, Ramachandran, et al.: "Model-carrying code: a practical approach for safe execution of untrusted applications", ACM SIGOPS Operating Systems Review 37.5 (2003): pp. 15-28. (Year: 2003).
Stripf, Timo, et al.: "A compilation-and simulation-oriented architecture description language for multicore systems", 2012 IEEE 15th International Conference on Computational Science and Engineering. IEEE, 2012. pp. 383-390 (Year: 2012).
Szekely, Pedro, et al.: "Declarative interface models for user interface construction tools: The Mastermind approach", Engineering for Human-Computer Interaction: Proceedings of the IFIP TC2/WG2., Yellowstone Park, USA, Aug. 6, 1995. Springer US, 1996. pp. 120-150 (Year: 1995).
Tenorth, Moritz, et al.: "Understanding and executing instructions for everyday manipulation tasks from the world wide web", 2010 ieee international conference on robotics and automation. IEEE, 2010.pp. 186-1491 (Year: 2010).
Vaswani, A., et al.: "Attention is all you need", 31st Conference on Neural Information Processing Systems (NIPS 2017), arXiv:1706.03762v7 [cs.CL], Aug. 2, 2023.
Yan, Ying, et al.: "Confidentiality support over financial grade consortium blockchain", Proceedings of the 2020 ACM SIGMOD International Conference on Management of Data. 2020. pp. 2227-2240 (Year: 2020).
Zyskind, Guy: "Efficient secure computation enabled by blockchain technology", Diss. Massachusetts Institute on Technology, 2016. pp. 1-128 (Year: 2016).
Buyya, Rajkumar, et al., "Modeling and simulation of scalable Cloud computing environments and the CloudSim toolkit: Challenges and opportunities." 2009 international conference on high performance computing & simulation. IEEE, 2009. pp. 1-11.
Chard, Ryan, et al. "DLHub: Model and data serving for science." 2019 IEEE International Parallel and Distributed Processing Symposium (IPDPS). IEEE, 2019. pp. 283-292. (Year: 2019).
Fisher, Michael, and Michael Wooldridge. "Executable temporal logic for distributed AI In." Proceedings of the Twelfth International Workshop on Distributed Artificial Intelligence (IWDAI-93). 1993. pp. 131-142. (Year: 1993).
Flynn, Michael J., "Very high-speed computing systems." Proceedings of the IEEE 54.12 (2005): pp. 1901-1909.
McKeen, Frank, et al. "Innovative instructions and software model for isolated execution." Hasp@ isca 10.1 (2013). pp. 1-8.
Nilsson, Nils J. "A mobius automaton: An application of artificial intelligence techniques." Proceedings of the 1st international joint conference on Artificial intelligence, IJCAI. vol. 69. 1969. pp. 509-520. (Year: 1969).
Anonymous: The Sandbox Whitepaper, The Sandbox, Oct. 29, 2020, Retrieved from the Internet: URL https://web.archive.org/web/20201029122558if_/https://installers.sandbox.game/The_Sandbox_Whitepaper_2020.pdf. retrieved on Sep. 28, 2022.
Extended European Search Report at the European Patent Office issued in European Patent Application No. 22827810.7 / 4359988, dated Apr. 1, 2025.
Guzzoni et al., "Active, A Tool for Building Intelligent User Interfaces." ASC, 2007, pp. 1-6, Year: 2007.
Guzzoni, et al., "Modeling Human-Agent Interaction with Active Ontologies.", AAAI Spring Symposium: Interaction Challenges for Intelligent Assistants, 2007, pp. 1-8, Year: 2007.
Alverson, Gail A. et al., "Program structuring for effective parallel portability." IEEE Transactions on Parallel and Distributed Systems 4.9 (1993): pp. 1041-1059. (Year: 1993).
Steinwold, "AI + NFTs: What is an INFT?", Apr. 6, 2021, Available at: https://andrewsteinwold.substack.com/p/ai-nfts-what-is-an-inft— 10 pages.

* cited by examiner

202 →
```
[
  {
    "ballCenterPosition": { "x": 113, "y": 78 },
    "oppositionPaddleCenterPosition": { "x": 512, "y": 64 },
    "playerPaddleCenterPosition": { "x": 0, "y": 64 }
  },
```

204 →
```
  {
    "ballCenterPosition": { "x": 120, "y": 74 },
    "oppositionPaddleCenterPosition": { "x": 512, "y": 60 },
    "playerPaddleCenterPosition": { "x": 2, "y": 63 }
  }
]
```

```
1    public KeyCode moveUp = KeyCode.W;
2    public KeyCode moveDown = KeyCode.S;
3    public float speed = 10.0f;
4    public float boundY = 2.25f;
5    private Rigidbody2D rb2d;
6
7    void Start () {
8        rb2d = GetComponent<Rigidbody2D>();
9    }
10
11   void Update () {
12       var vel = rb2d.velocity;
13       if (Input.GetKey(moveUp)) {
14           vel.y = speed;
15       }
16       else if (Input.GetKey(moveDown)) {
17           vel.y = -speed;
18       }
19       else {
20           vel.y = 0;
21       }
22       rb2d.velocity = vel;
23
24       var pos = transform.position;
25       if (pos.y > boundY) {
26           pos.y = boundY;
27       }
28       else if (pos.y < -boundY) {
29           pos.y = -boundY;
30       }
31       transform.position = pos;
32   }
```

FIG. 4

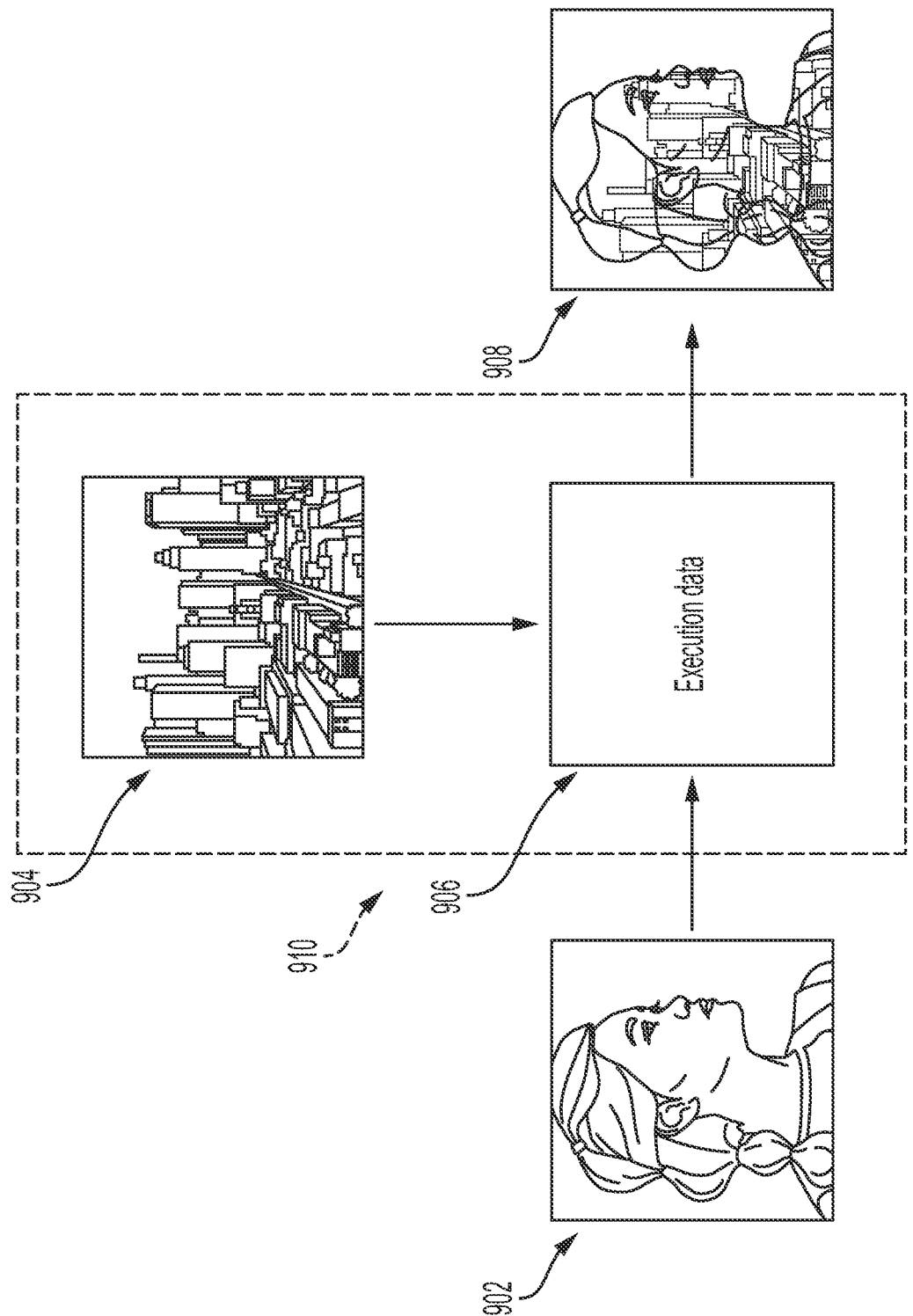

INTEROPERABLE COMPOSITE DATA UNITS FOR USE IN DISTRIBUTED COMPUTING EXECUTION ENVIRONMENTS

RELATED APPLICATION DATA

This application is a continuation-in-part of U.S. application Ser. No. 18/107,804, filed on Feb. 9, 2023 (now U.S. Pat. No. 12,306,846), which is a continuation-in-part of U.S. application Ser. No. 17/353,898 (now U.S. Pat. No. 11,797,274) filed on Jun. 22, 2021, the entire disclosures of which is incorporated herein by reference.

BACKGROUND

Computing execution environments, such as distributed video game environments, bot networks, and complex financial transaction environments have become ubiquitous. In many such environments, participants can be represented as an object with privileges and characteristics. For example, in a video game environment, a player avatar may have specific capabilities, such as speed, agility, and strength. The capabilities associated with the player avatar can be stored within the execution environment. However, each environment has its own formats and protocols. Further, these environments must have a centralized, trusted authority that is the keeper of the data. Accordingly, use of the objects must remain isolated to the creating execution environment. As such, activity in other environments does not, and cannot, affect the object. Further, the need for a trusted party prevents implementation of such objects on decentralized computing execution environments, such as blockchain networks and other distributed ledger technology (DLT), or other interoperable non-DLT systems.

BRIEF SUMMARY

Disclosed implementations provide composite data units representing executable data, such as artificial intelligence models that can be owned, traded, and used in various execution environments. Coupling executable data with a strictly defined interface allows anybody to use it in any execution environment that supports the interface. Further, coupling the executable data with a non-fungible cryptographic token allows the executable data and other components to be owned and traded as a unit. In one disclosed implementation, the composite data structure representing the executable data is referred to as a "composite unit" herein. In another disclosed implementation, the composite data structure representing the executable data is referred to as an "enhanced composite unit" herein. The tradeable composite units have utility across multiple supported execution environments, such as video game environments, chat bot environments and financial trading environments. Additionally, the interface allows for the creation of pipelines and systems from multiple complementary composite units.

One disclosed implementation is a composite data structure recorded on non-transitory computer readable media for providing a computation model that can be implemented in multiple execution environments, the data structure comprising: an execution pointer specifying execution data can be associated with a computation model, wherein the computation model is configured to process data in a predetermined manner; an interface definition module including a pointer to an interface definition associated with the computation model; and a database pointer including a pointer to a database entry associated with the execution pointer.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings' various illustrative embodiments. It should be understood, however, that the invention is not limited to the precise arrangements and instrumentalities shown. In the drawings:

FIG. 2 illustrates and example of an interface definition of a composite unit.

FIG. 4 is an example of a code snippet of execution data in accordance with disclosed implementations.

FIG. 9a illustrates an example of an image as execution data in accordance with disclosed implementations.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

The composite units in accordance with disclosed implementations provide trade-ability, interoperability and composability of models, such as artificial intelligence models, that can be implemented in various execution environments and moved from one execution environment to another. By coupling an execution data with a strictly defined interface definition, the composite unit allows multiple execution environments to implement support for the interface and for other execution data to fit into that interface. The result is the ability to own and trade composite units that have utility across multiple supported execution environments. Additionally, the interface allows for the creation of pipelines and systems from multiple complementary composite units.

A composite unit in accordance with disclosed implementations includes 3 components:

Execution Data a specification of executable code implementing the model (e.g., a content addressed URL where an executable code AI model is stored and accessible);

Interface Definition: a specification of inputs accepted by the model and outputs of the model (e.g., a content addressed URL where an interface definition for the relative model is stored and accessible).

Blockchain Reference: A pointer to a Non-Fungible Token (NFT) corresponding to the model and stored on a decentralized computing network, such as a blockchain or other distributed ledger technology.

Figure 1:
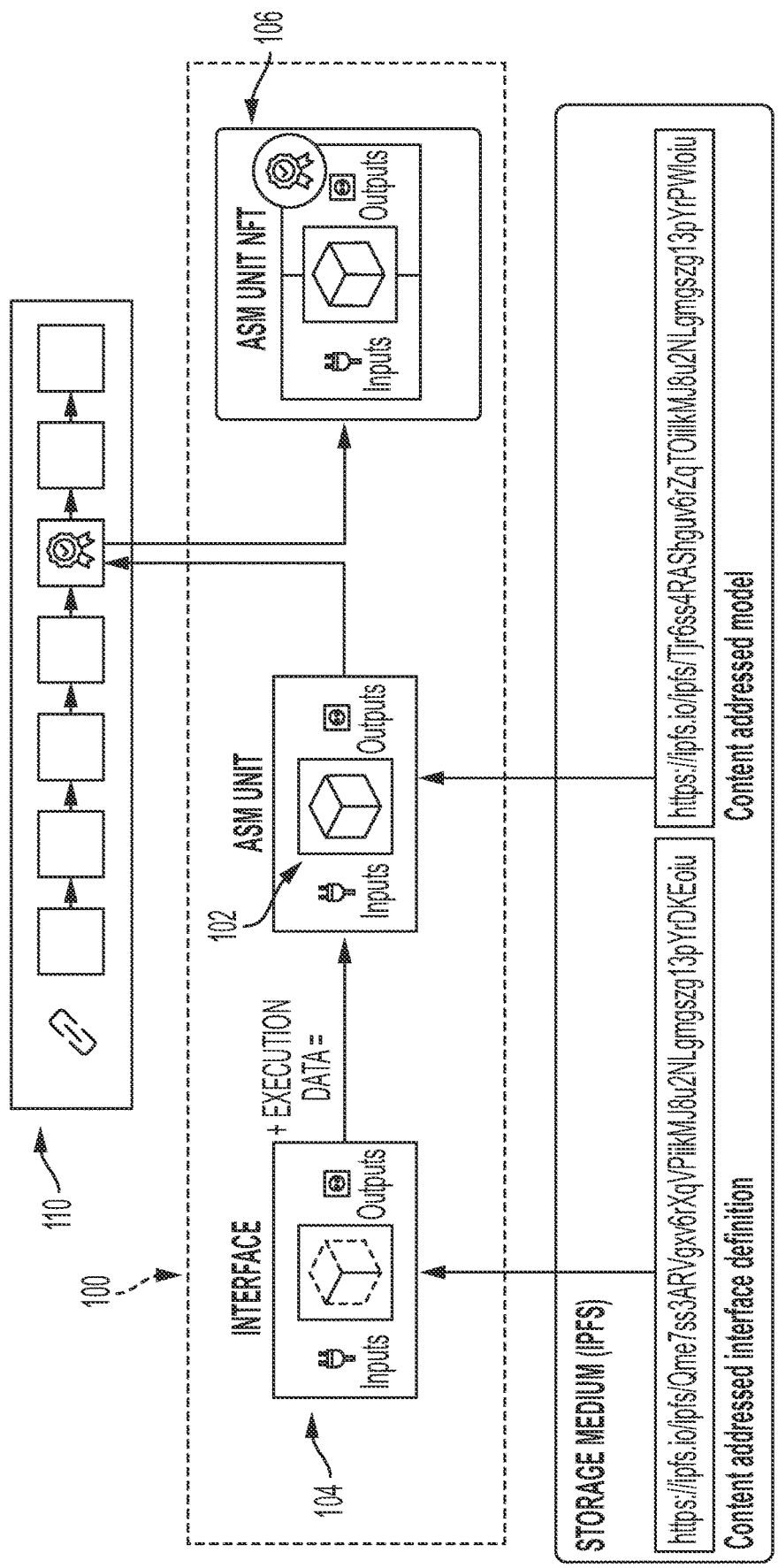
FIG. 1 is a schematic representation of the structure of a composite unit in accordance with disclosed implementations.

FIG. 1 illustrates the architecture of a composite unit in accordance with disclosed implementations. Composite unit 100 includes content addressed model 102, interface specification 104, and token pointer 106 (which associates the composite unit 100 with an NFT stored on decentralized ledger 110. Note that elements 102, 104, and 106 are data elements stored on non-transitory computer-readable media as a data structure. The elements can be linked in various manners, by being stored in a single data structure, through relational tables, or the like. The term "pointer" as used herein, encompasses all mechanisms for linking/associating multiple specified elements, either directly or indirectly. Also, the elements can store the corresponding data or code, or can otherwise specify the data or code through a URL or other address, a link, or the like. For example, content addressed model 102 can include the model code for executing the model or, as illustrated in FIG. 1, include an address to the storage location of the model code. Decentralized ledger 110 can be part of a decentralized environment such as a blockchain network. The NFT is a unique token that can be used to identify and represent ownership of composite unit 100, regardless of the executing environment in which composite unit 100 is being used at the time.

As a simple example of composite unit 100, consider the classic computer game PONG™. An example interface definition for a composite unit for the computer game PONG™ is shown in FIG. 2. As illustrated in FIG. 2, the input, from the most recent N (N=2 in this example) frames of game play are shown at 202 and 204. The inputs include x and y positions of the ball, and each player's paddle, from which the following can be deduced:

Ball position, speed, and trajectory,
Opponents paddle position, speed, and trajectory; and
Player's own paddle position, speed, and trajectory.

The output of the interface in this example is the player's paddle movement instructions for the next frame, as shown at 206. The x and y values will be added to the current player's paddle position.

By defining a strict interface for model inputs and outputs the models can be deployed across multiple environments that provide support for that interface. The constraints of standard PONG™ are very simple and the physics are linear, but this interface could be applied to multiple variants with different constraints and physics. By tweaking the number frames taken as input, models could be trained for a game variant with more complex constraints and non-linear physics. The disclosed implementations can be used to create a diverse ecosystem of competitive PONG™ tournaments where AI models are trained to compete across the field in different variants of the game. Disclosed implementations can be applied to more complex environments in gaming and beyond as described in examples below.

Composite units can be linked across execution environments (referred to as "arena's" herein) via an input value matrix which is a data structure containing a set of values that can be mapped to input variables within the arena and composite unit. This allows both consistency and flexibility in how the composite units are deployed by providing a single input reference but giving the arena developers the choice on how they are mapped. Arenas can refer to any environment the composite unit might interact with, examples include a level within a video game, an entire game, a trading bot, and/or a single interaction. "Arena agents" are the code that executes the outputs of the composite unit.

Figure 3:
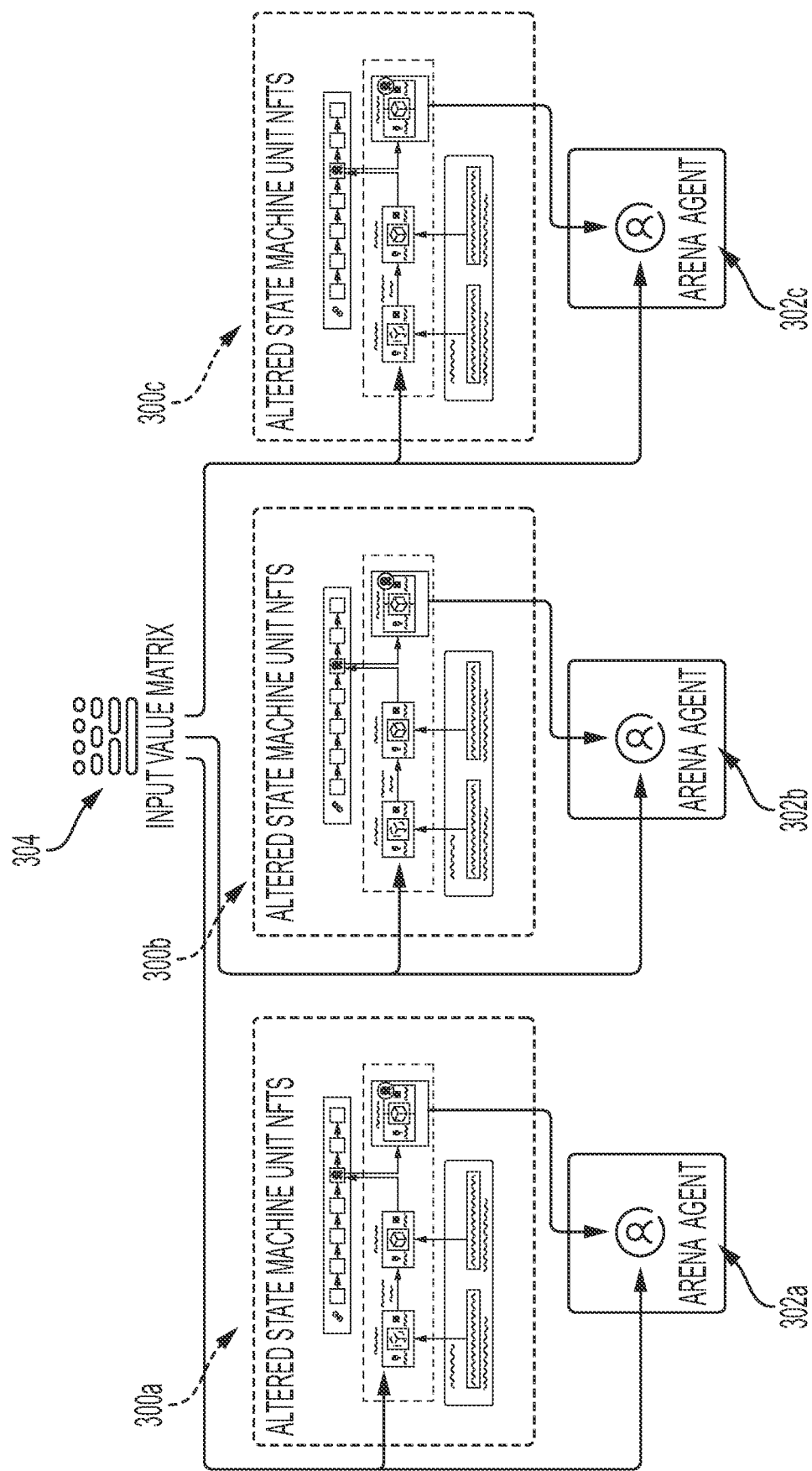
FIG. 3 is a schematic illustration of linking between composite units and one or more input value matrices in accordance with disclosed implementations.

FIG. 3 illustrates multiple composite units, one for each arena, coupled to an input value matrix. Each composite unit, 300a, 300b, and 300c in this example, has a corresponding arena agent 302a, 302b, and 302c. Input value matrix 304 is coupled to each composite unit through the corresponding arena agent.

A very simple example input value matrix, in table form, is set forth below.

| Value 1 | 5 |
| Value 2 | 2 |
| Value 3 | 6 |

With respect to the video games PONG™ and SPACE INVADERS™, application of the input value matrix might be as follows. In PONG™, an arena developer might want to add a constraint to the agent for maximum paddle speed, this can be achieved by mapping Value 3 in the input value matrix to the speed variable within the controller script, which can be part of model of the corresponding composite unit 100 (see FIG. 1). A snippet of an example of model code which controls movement of the paddle is illustrated in FIG. 4. The speed variable is indicated at 402. In an example relating to SPACE INVADERS™, an arena developer might want to add a constraint to the agent for maximum speed of the space craft by mapping Value 3 to the input value for the variable speed. As noted below, this mapping can be a source of uniqueness and thus is referred to as "genome mapping" herein.

Figure 5:
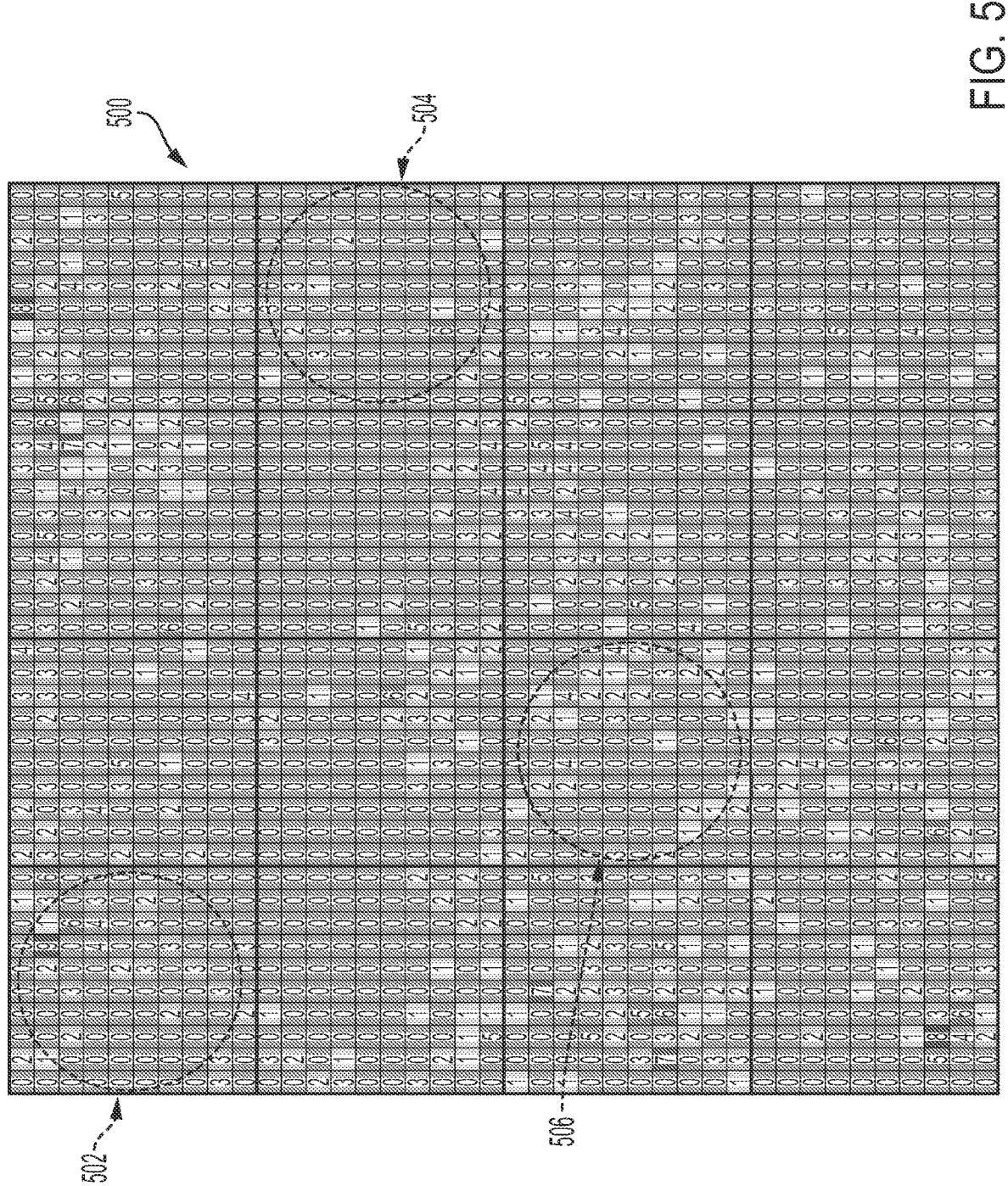
FIG. 5 is a table illustrating an input value matrix in accordance with disclosed implementations.

The input value matrix described with respect to FIG. 3, and FIG. 4 is a very simple example for illustrative purposes. FIG. 5 illustrates a more complex input value matrix 500 in accordance with disclosed embodiments. At least some of the variables in the input value matrix 500 represent attributes of a player entity in a video game. In the example of FIG. 5, a set of variables can be related to a category of attributes. For example, attributes 502 represent strength of the player entity with respect to the relevant arena, attributes 504 represent intelligence of the player entity with respect to the relevant arena, and attributes 506 represent agility of the player entity with respect to the relevant arena. Each set of values in input value matrix can be mapped to an array of variables in model code or each variable can be mapped to an individual variable in the model code. The input value matrix can be randomly generated and each game developer can designate/tag areas of the matrix as corresponding to specific skills. Tags can be associated with each area and game developers can leverage the tags created by previous developers to create a similar skill set for a similar game. Developers of different types of games may choose to create and or use a set of tags that is very different from a set of tags for a different game. Therefore, the input value matrix can be a set of values and associated TAG cloud(s) that can be used/grouped/tagged as desired. The game developer can decide which tags to use based on the type of game and desired play characteristics, but likely would want to be consistent with other similar games.

As noted above, the composite unit in accordance with disclosed implementations can be applied to video games. Disclosed implementations of a gaming platform and protocol example are described in greater detail below. The platform allows users to mint game player entities (referred to simply as "players" below) and upgrade their statistics, earn, buy, and sell them as NFTs within the ecosystem. The model code incorporates machine learning to create a "brain" that can change and adapt within, and as a result of, gameplay.

The protocol and platform allow multiple games to be created by developers to interact with players. Different players can have different levels of various relevant skills (such as strength, speed, intelligence, . . . ). A player may be an interactive intelligent non-player character (NPC) in a game with human backed players. An NPC is character or other entity in a game that is not controlled by the person(s) playing the game. A player can be defined by 3 parts, the base "frame", a "form" defining the player's aesthetic and attributes (for example, the frame and form can be in the form of the input value matrix defined above), and a trainable "brain" (for example in the form of the executable model described above. A user can create new players by minting a new NFT Pack including these components with default attributes. Some frames, forms and/or brains will contain rare attributes or may start from a higher level in their potential meaning, for example, that the corresponding player is a faster learner who take less time to reach the pinnacle of certain skills.

To play a game, a frame, form, and brain are selected and linked to one another. With gameplay each component will be modified in unique ways. The combination of frame, form and brain impact the learning model and can produce an extremely large set of decision-making processes and combinations in the specific machine learning model storage for the player (i.e., the brain). Simply attaching a "more advanced" brain or "more capable" form to a frame might not immediately result in a superior player because a brain that has been trained to use a form with certain attributes will need to relearn when combined with a form with different attributes or with different values for those attributes. Even two frames with forms and brains with identical attributes might also develop totally different training in the brain model based on game play. This allows for an enormous universe of unique "personalities" to develop.

This model of separating attributes and attribute values, which can be attached and detached from a frame, allows users to design the ultimate strategy by combining unique parts of the player from different frames, forms and brains.

Significantly, this structure allows a user to choose a form for a specific arena or a brain for a specific task or strategy or when facing a specific opponent. Each form or brain can be categorized, for example, as 1 of 5 types; Defective, Common, Rare, Epic, and Legendary. The Players can be defined using a .yaml file that holds the attributes and is stored using IPFS. YAML is a serialization language that is often used as a format for configuration files as a replacement for languages like JSON. IPFS is a well-known peer-to-peer hypermedia protocol. YAML is only one example of a file structure/format that could be used to store data defining a player and attributes. As a result of this configuration, "memories" are immutable, decentralized, and can be linked specifically to an NFT.

A frame includes a set of universal attribute values assigned at minting. The values can start low but could be upgraded by completing tasks in the platform and/or purchasing boosts with the platform currency. For example, the frame attribute values can correspond to:

Strength;
Fitness;
Speed;
Dexterity;
Intelligence;
Charisma;
Perception;
Luck; and/or
Size Forms can be game-specific and can have attribute values providing additional skills or attributes, to modify skills and attributes, for a specific task, such as a game against a specific opponent. In order to enter an arena, an arena specific form can be required to be attached to the frame. This allows a frame to participate in multiple arenas if it has multiple forms. Forms can also contain multipliers of frame stats that might be useful for a specific arena. These can be randomly assigned and can include rare attributes. Once a form is minted, games can upgrade skill levels internally through mapping multipliers or the like.

Brains can be defined as frames, i.e. a memory address associated with an NFT and storing the code for executing a learning model. Brains can be used with various forms. However, a new form may require the brain to learn how to use the modified attributes and attribute values specified therein. Brains also have attributes which can boost the attached frame and might be more useful to a specific arena(s). Frames can contain multiple memories which store the training for a specific learning model and form combination to thereby allow training for several combinations for a specific arena.

In order for a brain to learn, it needs to be trained through activity, e.g., game play. Training can be accomplished in a "gym" platform. A "gym", as used herein, can be a GPU-powered machine learning model trainer. The model is influenced by the attributes associated with the player NFT. As the learning model of the brain uses a neural network, the specific outcomes of training a specific player are unique. Players are able to model their attributes by training at a gym, which in turn makes their AI better at playing the game. Each player can have an .onnx file that is updated each time they train at the gym. ONNX is an open format built to represent machine learning models. Training at the gym can be a process similar to mining cryptocurrency, where GPUs are used to train the unique brain of your NFT. The protocol can provide an incentive to those who host the gym as the users of the gym can be required to pay for gym usage. During a gym session a user will be able to see their player improve, by monitoring the attributed through a file viewer for example, and be able to end the session once their decided outcome is An Enhanced Composite Unit (ECU) is disclosed below. The ECU expands on the composite data unit disclosed above to provide additional utility. An ECU is another example of a composite data structure in accordance with disclosed implementations. With an ECU, the actual execution data functions can be accomplished external to the ECU at the execution environment level. The execution data may leverage an interpreter or the like for execution as will be clear from the disclosure below. Further, the execution data can be any computing functionality and is not limited to ML or AI. The execution model can be represented by data (referred to as "execution data" herein), such as an image, video, or another multimedia as opposed to merely executable code. The execution model can be executable code, although not necessarily exclusively as such. The execution data need not be internal to the ECU. For example, the ECU can be associated with the execution data through a pointer or related elements in relational database. The execution data and any related code can be part of an execution environment that is separate from the ECU.

For a given execution model, there could be several sets of execution data or execution codes that will execute the same model in a similar way to provide compatibility and optimization for various execution environments. The interface definition of the ECU can be similar to that described above with respect to the composite unit. However, the database reference of an ECU is not limited to a non-fungible token or another type of token on a decentralized ledger. For example, the database reference can be an entry in more conventional, centralized storage or database systems, such as Amazon S3 and the like.

Further, in the ECU, the concept of a "Brain" is expanded upon to include an input value matrix to which a memory tree (discussed in detail below) can subsequently be attached. An input value matrix can be any sequence of values/characters (letters, numbers, symbols, etc) that could be represented in any shape (sphere, double helix, torus, etc) and any dimensions (2D, 3D, etc.). The input value matrix can be immutable (by being stored on a decentralized ledger for example) in a manner analogous to human DNA. Accordingly, the input value matrix is sometimes referred to as a "genome matrix" herein.

Figure 6:
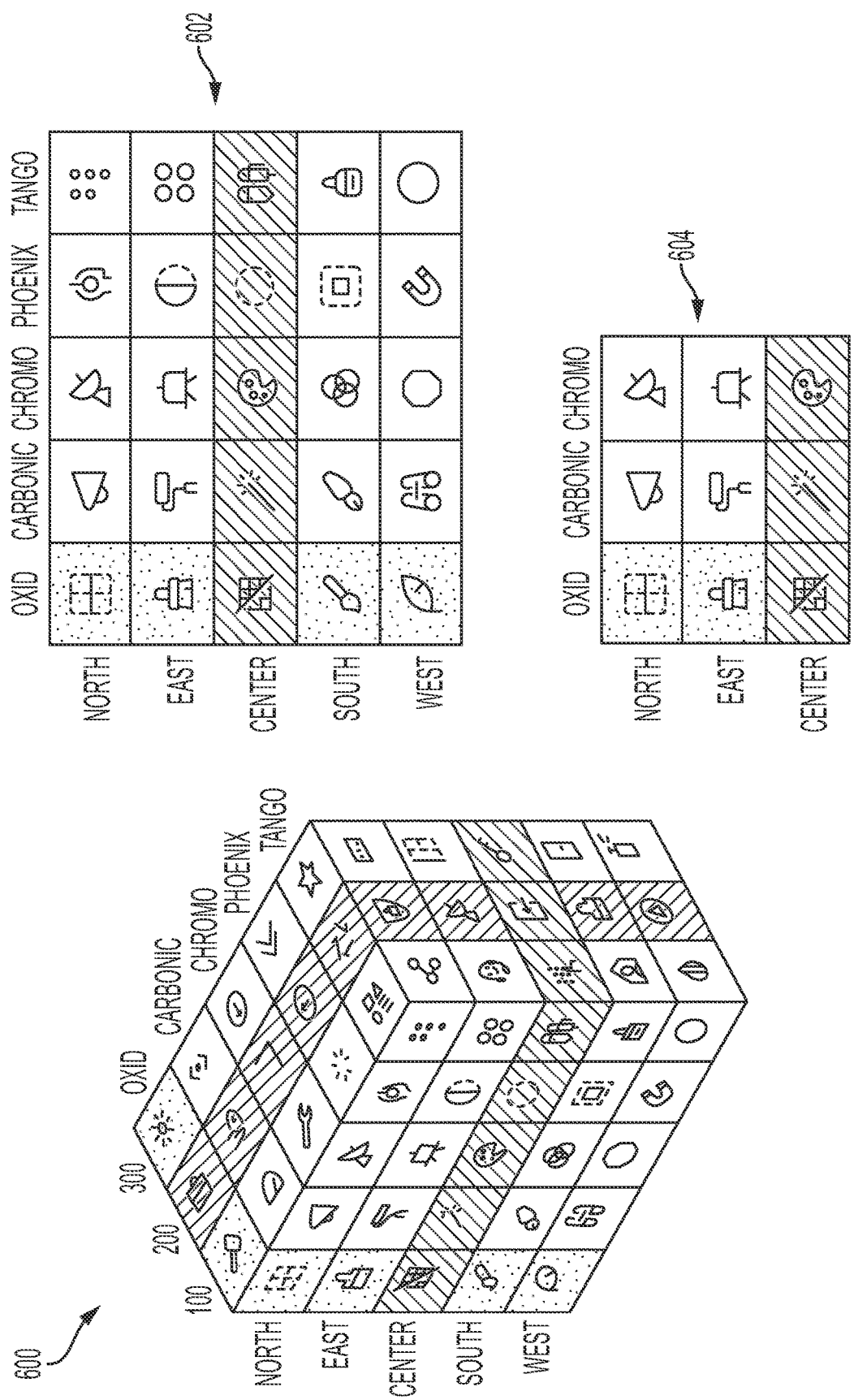
FIG. 6 illustrates a 3-dimensional input value matrix in accordance with disclosed implementations.
Figure 7:
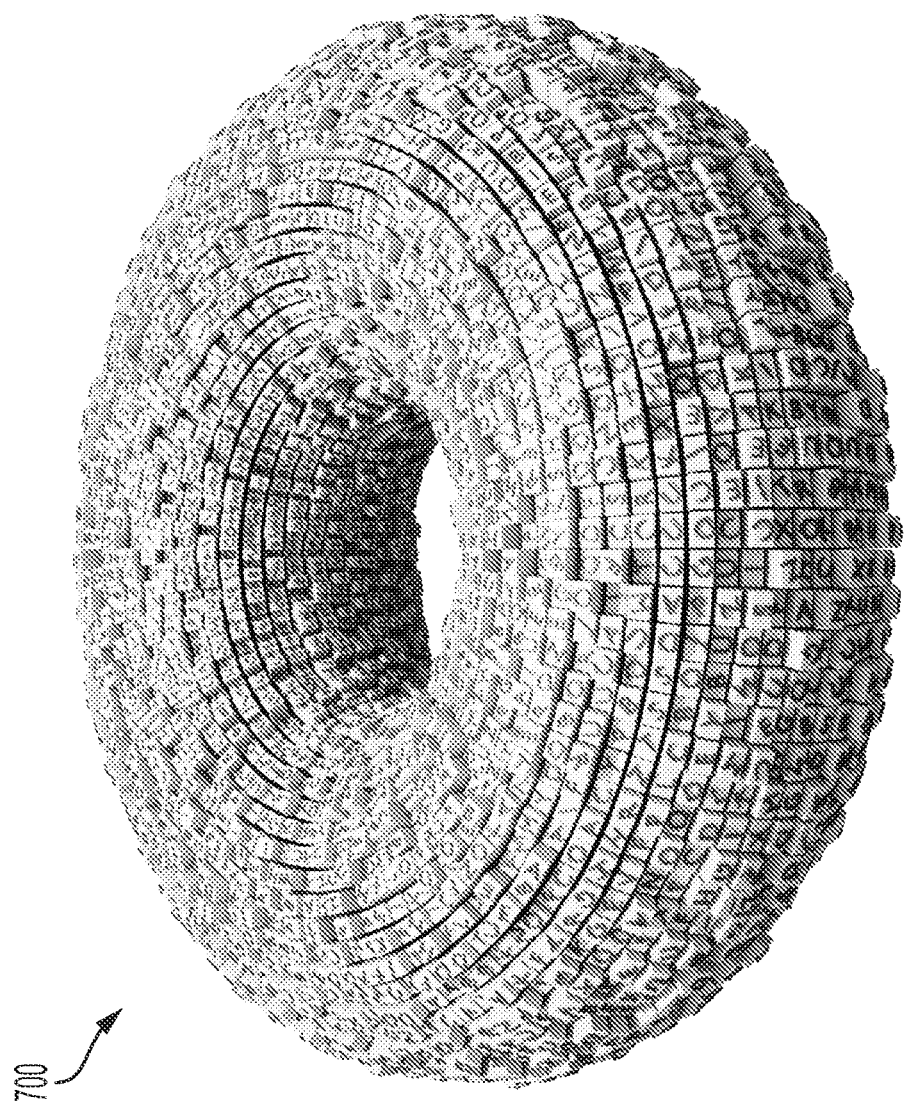
FIG. 7 illustrates a toroidal input value matrix in accordance with disclosed implementations.

Examples of the data structures of the input value matrix of ECUs in accordance with disclosed implementations are illustrated in FIGS. 6 and 7. While the input value matrix of FIG. 5 (which can be used in connection with the ECU) is two dimensional, the input value matrix can have any number of dimensions and can represent various geometric shapes. For example, input value matrix 600 of FIG. 6 is cubic (3-dimensional). One side of input value matrix 600 is shown at 602 and another side is shown at 604.

As noted above, variables in the input value matrix 600 can represent attributes of a player entity in a video game and a set of variables can be related to a category of attributes. For example, attributes of side 602 could represent strength of the player entity with respect to the relevant execution environment, and attributes of side 604 could represent the intelligence of the player entity with respect to the relevant execution environment. Again, each set of values in the input value matrix can be mapped to an array of variables in model code or each variable can be mapped to an individual variable in the model code. The input value matrix can be randomly generated and each game developer can designate/tag areas of the matrix as corresponding to specific skills, traits, values, attributes, properties, characteristics, limitations, rules, etc. Other than having more than 2 dimensions, input value matrix 700 can be similar to input value matrix 600 and can be applied in analogous manners. As another example, FIG. 7 shows an input value matrix that is substantially toroidal.

Figure 8:
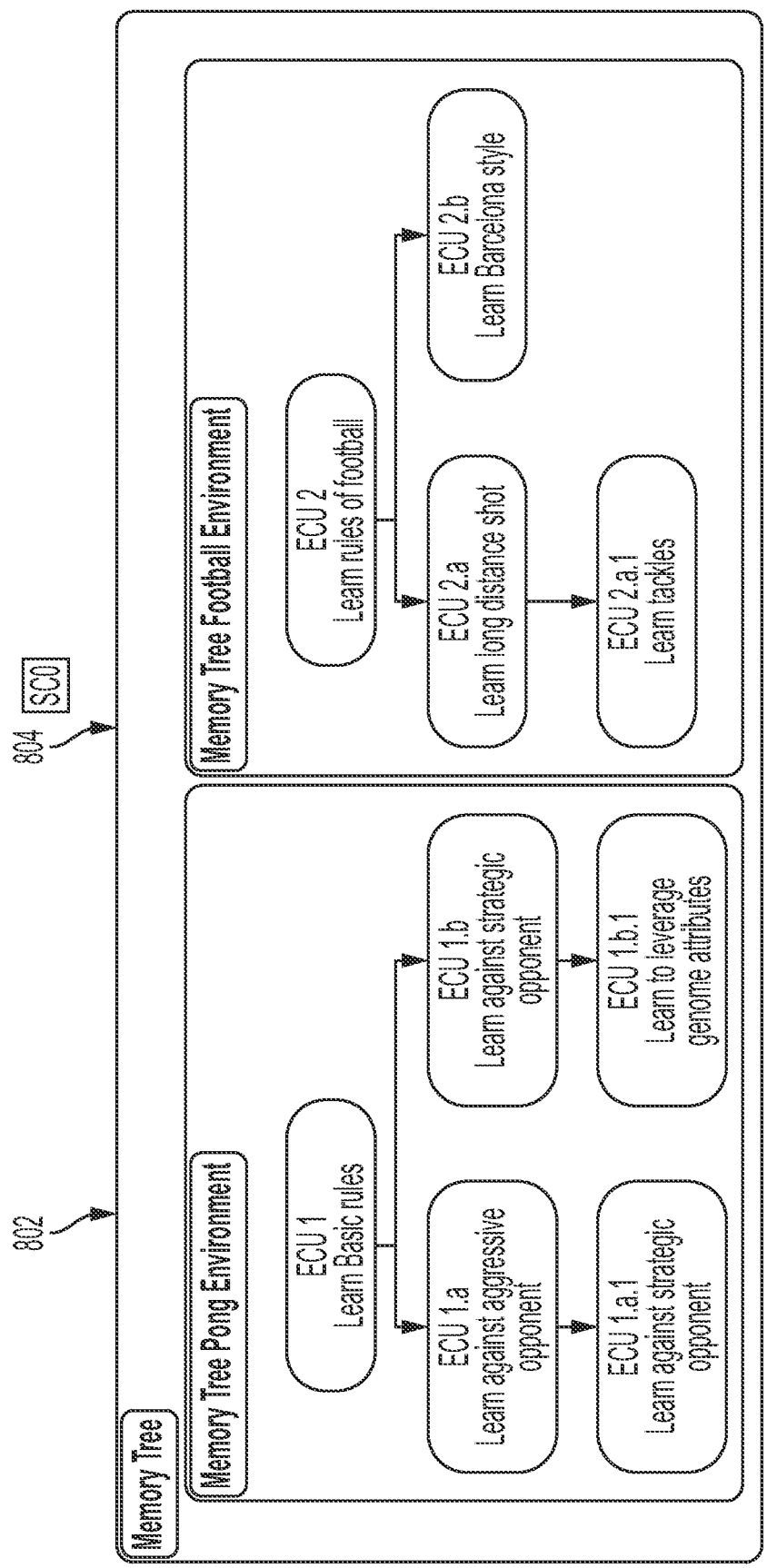
FIG. 8 illustrates examples of multiple composite data units packaged as a memory tree in accordance with disclosed implementations.

An ECU is sometimes referred to as a "memory herein. Multiple ECUs, (or "memories) can be packaged in a container and associated with one another in a tree-like manner through the use of a data structure referred to as a "memory tree" herein. Memories can allow the owner thereof to have some interaction in a particular execution environment. For example, one of these execution environments would be the ability to generate an ECU from another ECU, such as the generation of an image from a collection of other images or a single image (see FIG. 9*a*). The execution data of a memory (ECU) could be an AI model, executable code, or even an image. A memory tree is a node tree for memories/ECUs. Memory trees save memories as discrete entities and providing a "version history" for the end-user to return to and start a "new branch" as desired. FIG. 8 illustrates two examples, 902 and 904, of memory trees. Each memory tree includes multiple ECUs associated with one another in a treelike arrangement. The term "pointer", as used herein, can include a collection of multiple pointers, such as a memory tree. Each pointer can specify a collection of execution data. Each of the execution data collections can share the same interface definition. Thus each pointer is associated with an interface definition. As an alternative, the entire memory tree, or portions thereof, can share a single interface definition. In such an example, the memory tree structure thus contains a collection of execution data components. Each collection of execution data components can be a treelike structure that links the execution data with other execution data from the same composite data structure or ECUs with other ECUs.

It is possible to define another structure as a container of memory trees, where each memory does not contain the interface of a composite unit, instead each memory tree structure contains the interface that each memory points to.

Each container can define a Brain, as disclosed above, that is unique in multiple ways:
The nonfungibility of an associated NFT
The nonfungibility of the associated genome matrix as an input or layer of interpretation to the execution data
The nonfungibility of the associated Memory Tree The Brain can be augmented over time by adding composite units to the memory tree. In many implementations, composite units will be unique (non-fungible), and as such, a hash can be created to verify the uniqueness. However, some implementations of an ECU can be non-unique (fungible). However, even in this case, the interpretation of the unique input value matrix by the non-unique composite unit will become unique. The interpretation could be hashed to verify the uniqueness. In some implementations, the ECUs can be semi-fungible. In such a case, uniqueness is dependent on the execution environment. Not all execution environments will guarantee the uniqueness of the interpretation of any matrix by any composite unit but there exists at least one execution environment that will guarantee such uniqueness. For example, in an execution environment that doesn't utilize a diverse enough sample of the matrix as their "genome mapping", two composite units associated with two distinct input value matrices may produce the same result. Composite units, including ECUs, can be linked across execution environments (also referred to as "arena's" herein) via an input value matrix (which, as described above, is a data structure containing a set of values that can be mapped to input variables within the arena and the composite unit).

Multiple Brains can be associated together, in a process termed "splicing". You can imagine a situation where an owner may want to combine two or more Brains or multiple owners may coordinate to combine their Brains together. This "splicing" will produce a new Brain containing its own input value matrix/matrices, which could be a duplicate of one of the original Brains input value matrix or some sort of interpolation of the between them. In the spliced Brains, the memories could be duplicates, transfers, blends, etc. In a simple PONG™ example, where a composite unit is a controller of the PONG™ bar, an execution environment developer may decide to associate part of input value matrix with the speed of the bar displacement.

Figure 9B:
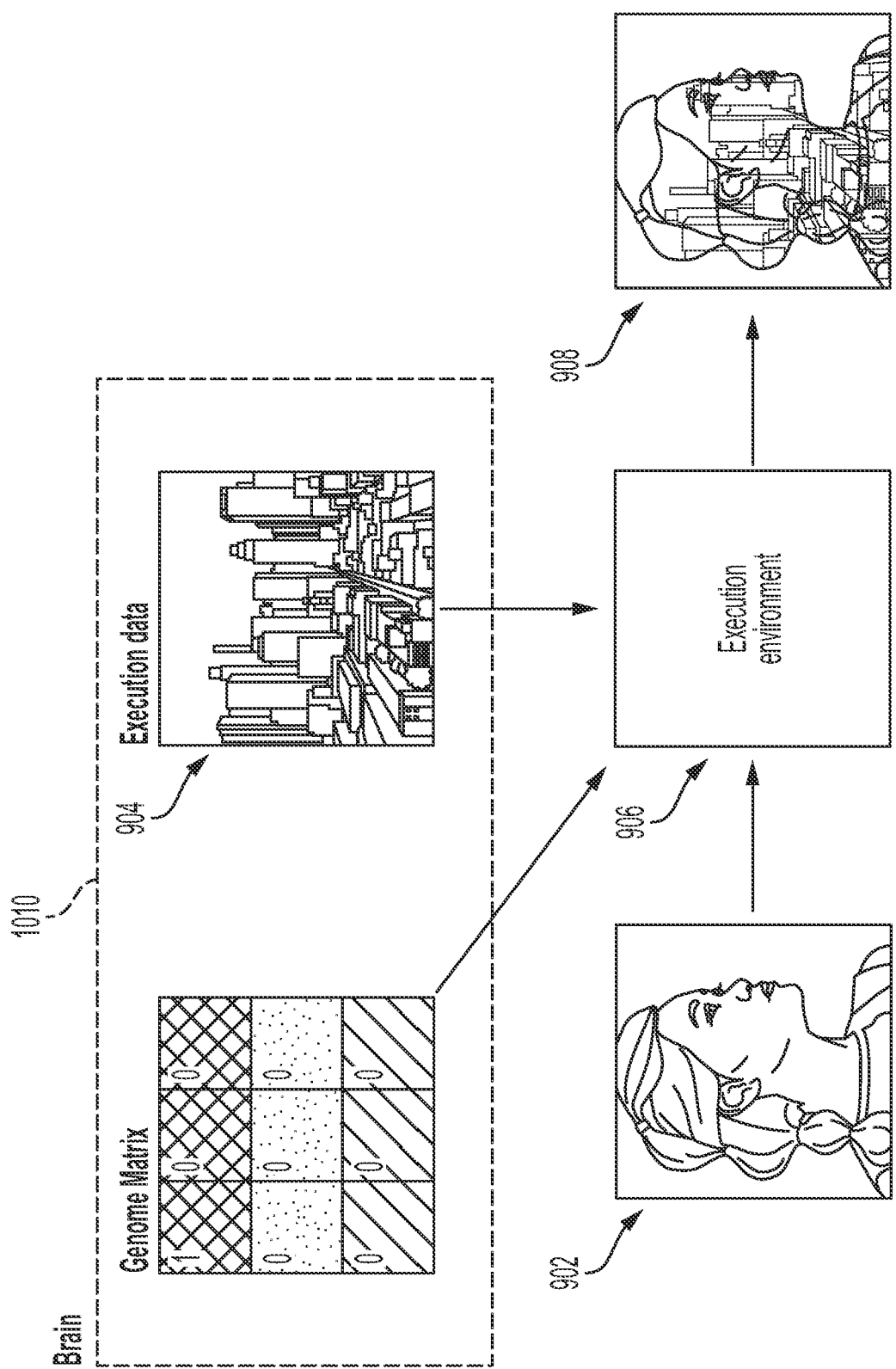
FIG. 9b illustrates another example of an image as execution data in accordance with disclosed implementations.
Figure 9C:
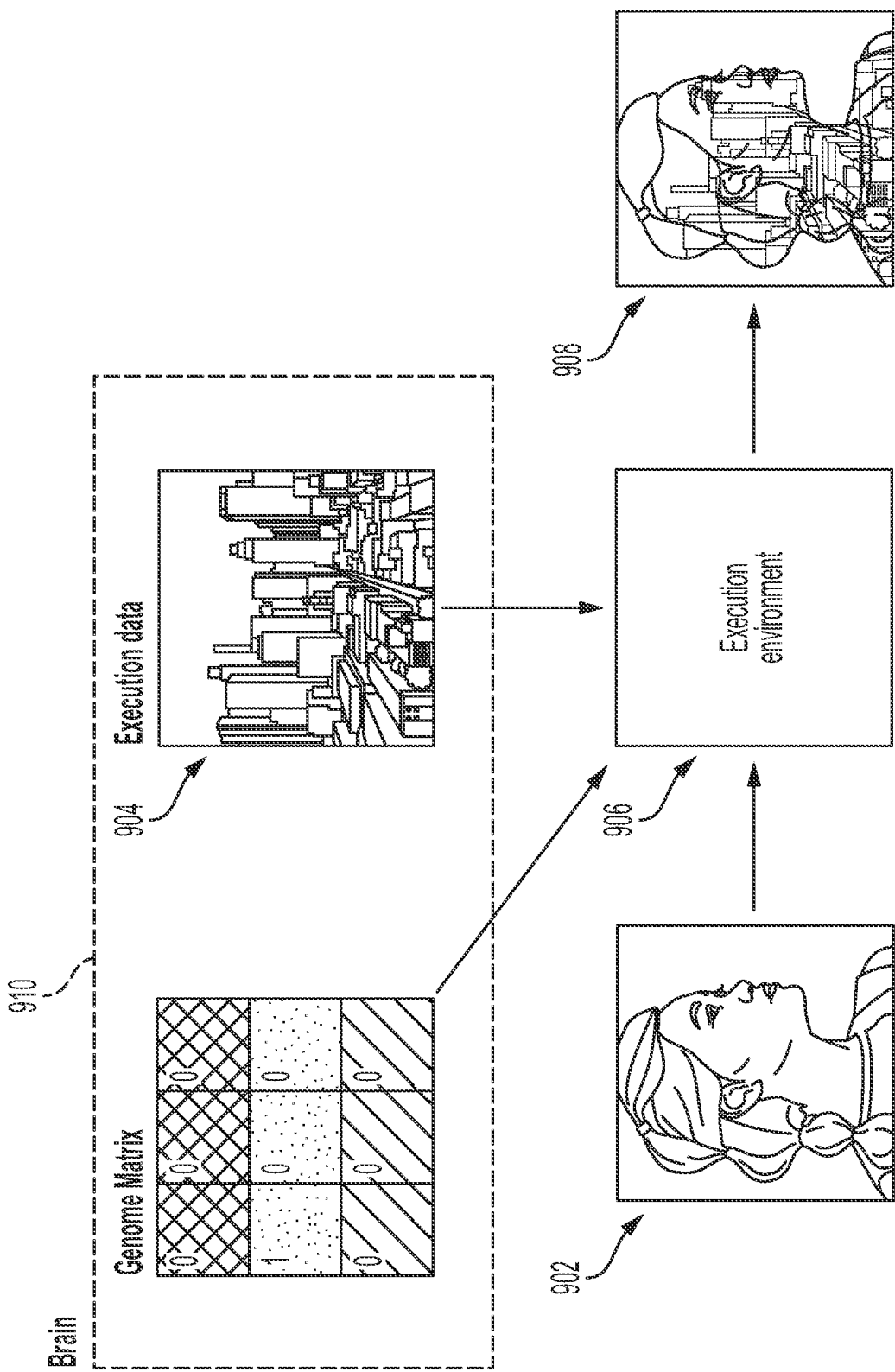
FIG. 9c illustrates another example of an image as execution data in accordance with disclosed implementations.

In other disclosed implementations, composite units can include digital images or other multimedia. This allows the creation of unique art styles (as an ECU or a collection of ECUs. As shown in FIG. 9a, an image (input 1) 902 can be processed by ECU 910 (which includes an image (input 2) 904 and associated execution data 906). Execution data 906 can be any type of data structure specifying an execution model as disclosed above. In this example, execution data 906 can be a matrix defined by the image data itself, or a portion thereof. Execution data 906 can be a watermark formed on image 904. Any unique data in or associated with image 904, mapped to execution data or other execution code (defined in an execution environment and not shown in FIG. 9a), can be used as execution data 904. In the example of FIG. 9a the execution data may contain both the image and the add/overlay/blend operation, or only the image while the operation is defined within the execution environment to result in an output of image 9008.

Figure 10:
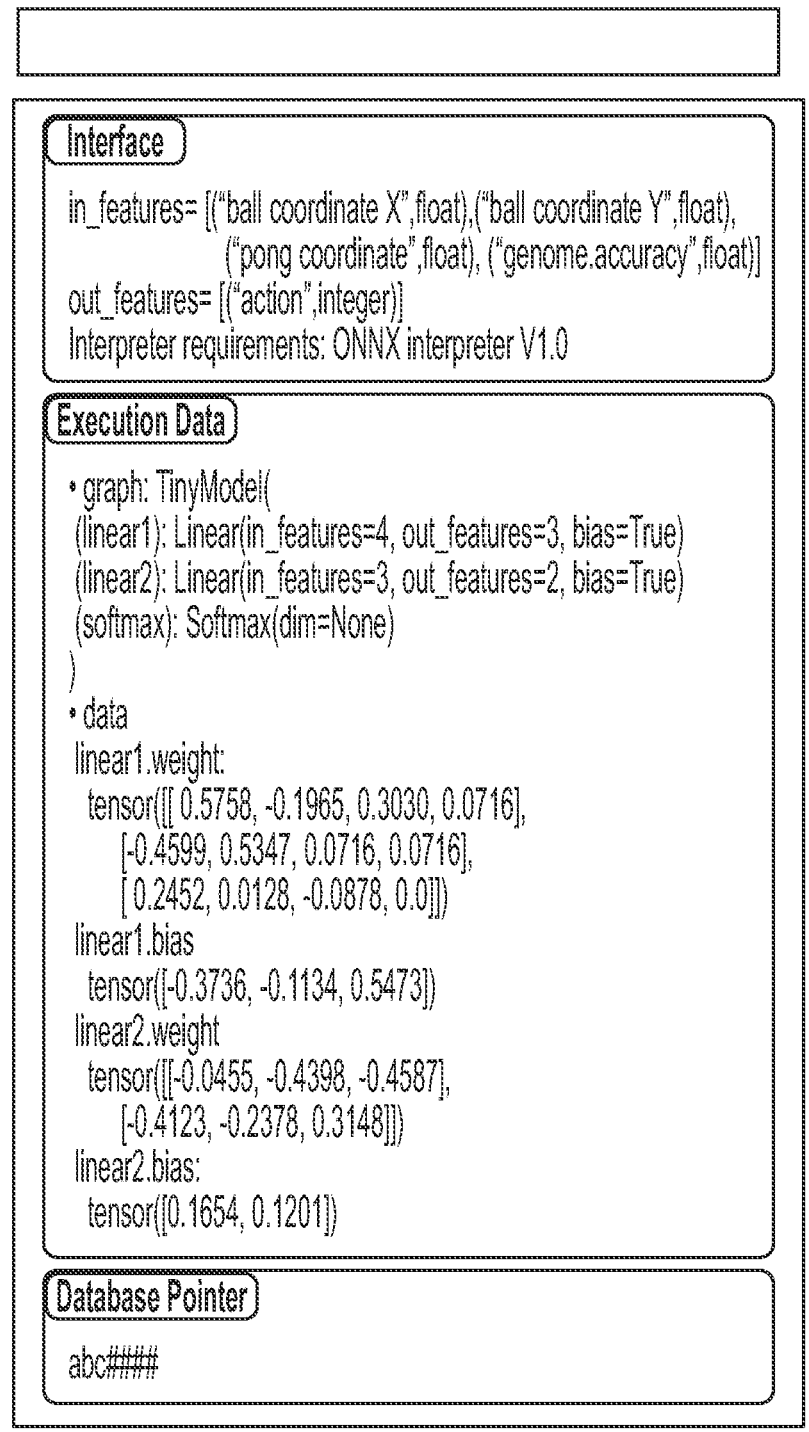
FIG. 10 is an example of a composite unit, an interface definition, executable data in the form of an AI model and a data pointer in accordance with disclosed implementations.
Figure 11:
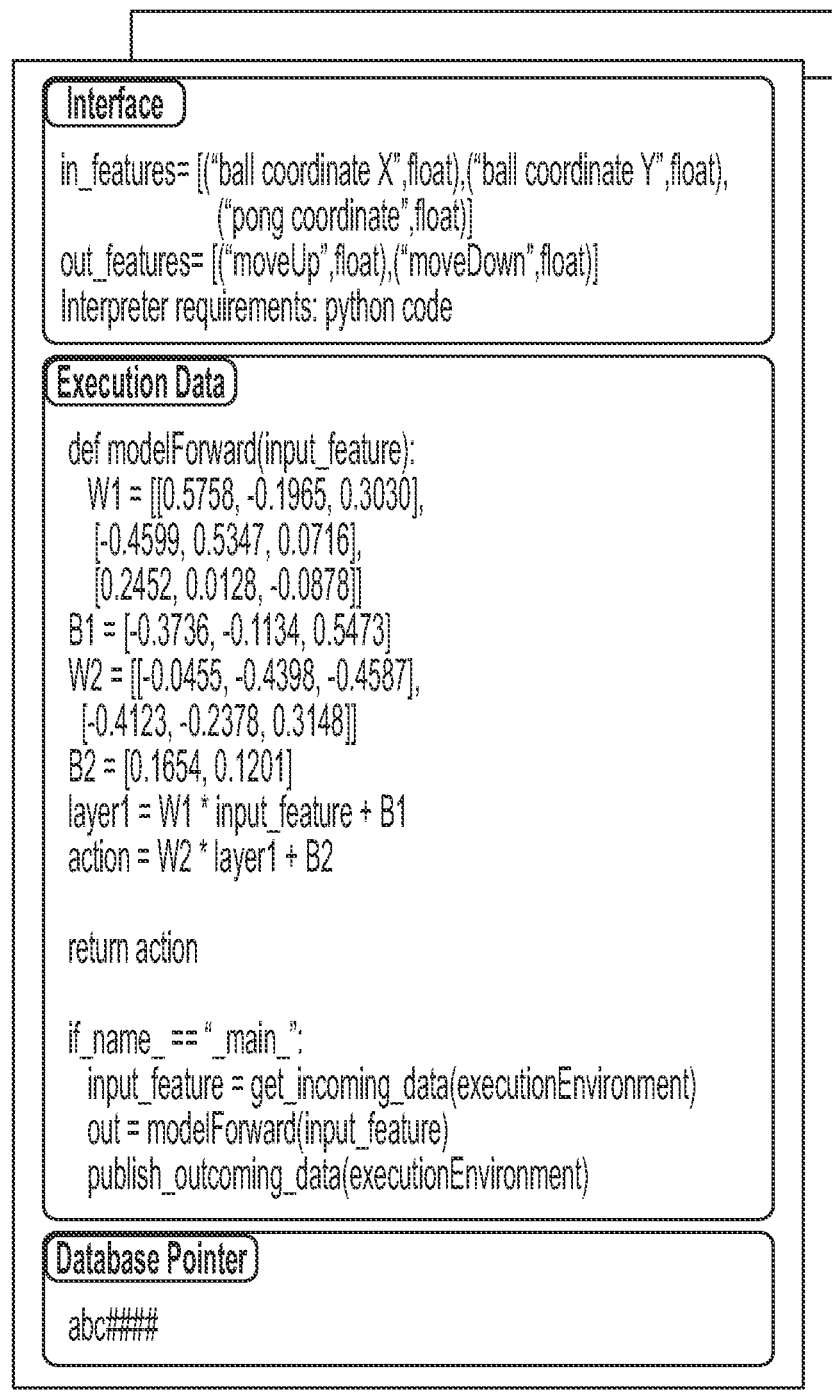
FIG. 11 is an example of execution data containing the execution code in accordance with disclosed implementations.
Figure 12:
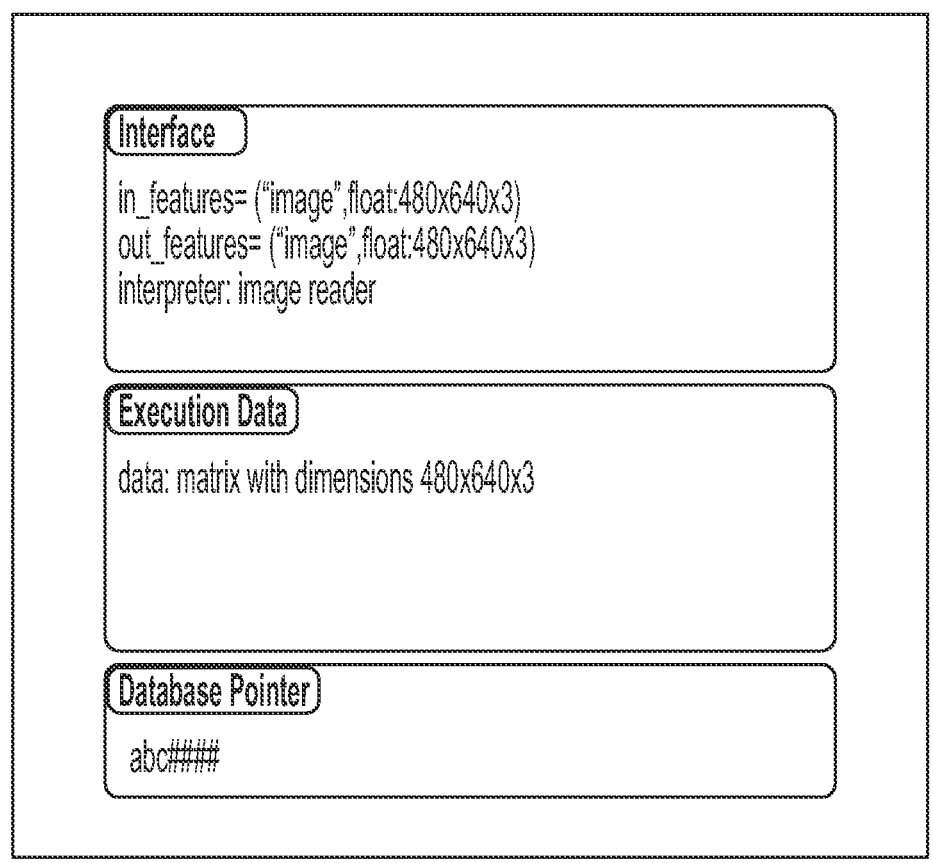
FIG. 12 is an example of a composite unit where the execution data doesn't contain execution code and the interpretation of the execution data is accomplished by the execution environment.

As noted above, the execution data can take various forms. FIG. 10 illustrates pseudocode of execution data 1000 in the form of an AI model. FIG. 11 illustrates pseudocode of execution data 1100 in the form of an executable code. FIG. 12 illustrates pseudocode of execution data 1300 in the form of an image, similar to the example of FIG. 10. Execution data 13 specifies that an image reader can read the entire 480×640 image to generate a matrix and that the matrix is input into execution code found at, or linked to, the specified blockchain reference. FIGS. 10 and 11 illustrate examples in which the interpretation of the execution data is accomplished by the composite unit, whereas, in the example of FIG. 12, the interpretation is left to the execution environment.

Users can connect to a game using their web3 wallet. The user then selects a player which is a combination of frame, form, brain and memory. Multiple players can be selected to create a team in the case of team play such as football. Two teams are required for a match/game. The game starts and the players are loaded, the game checks to ensure that NFT associated with the combination of frame, form, brain and memory is owned by the user when they enter the arena. The two sides compete to score enough winning points/goals in a specific time period.

The output of this result can be stored on a distributed ledger, such as a blockchain network against the record of the relevant NFTs. This enables an ecosystem of economic incentives and activities to develop around the players and the outcomes of Games. Game, player, and team stats can be displayed in various manners. Users can view an inventory of their frames, forms and brains as well as the makeup of their players and how the stats impact the players.

A user interface can be provided to allow players to be modified by attaching a combinations of frames/forms/brains. Users could wager on the outcome of games or rent a team to play a match or borrow a player to upgrade their team.

The platform includes a distributed ledger having a native token to be used for the payments noted herein. The token can be mined using a liquidity mining event. Once a user holds a native token, the user can use the native token to mine (or buy) a pack of a frame/form/brain combination. Packs will have a random chance of spawning a rare component of each. Mining can be based on a fair distribution curve, and a minimum stake can be required to mine a pack. The time it takes to mine can be reduced based on a user's staked amount. This allows early or strong supporters to benefit as well as later or smaller supporters to participate.

To make the game fair even for smaller participants, an increase in stake need not necessarily increase your individual chance of getting a rare attribute upon minting of an NFT. However, larger stakeholders could be able to mine more packs in the same amount of time with respect to smaller stakeholders. Packs can be released in editions and, over time, editions can contain new attributes as the models evolve or some editions may contain limited runs. However, because the performance of a player is determined by its training and experience even a "low" spec character has a chance of developing a winning capability/strategy. The native token can also be used for the payments between providers of GPUs to gyms and users of those gyms. Native tokens can also be used to purchase players from other users, to buy access to an arena, or to purchase cosmetic items or loot boxes for players.

The specific examples described above relate primarily to video games. However, the disclosed implementations can be applied to various applications and the "player" entity could be, for example, a chat bot (to give an individual personality to an online friend), a personal assistant that is truly personal, and/or a trading bot which acts on behalf of its owner or its community to accomplish transactions in accordance with a dynamic trading strategy. Any task that could be completed by an intelligent automated agent could be accomplished using the disclosed implementations.

Figure 13:
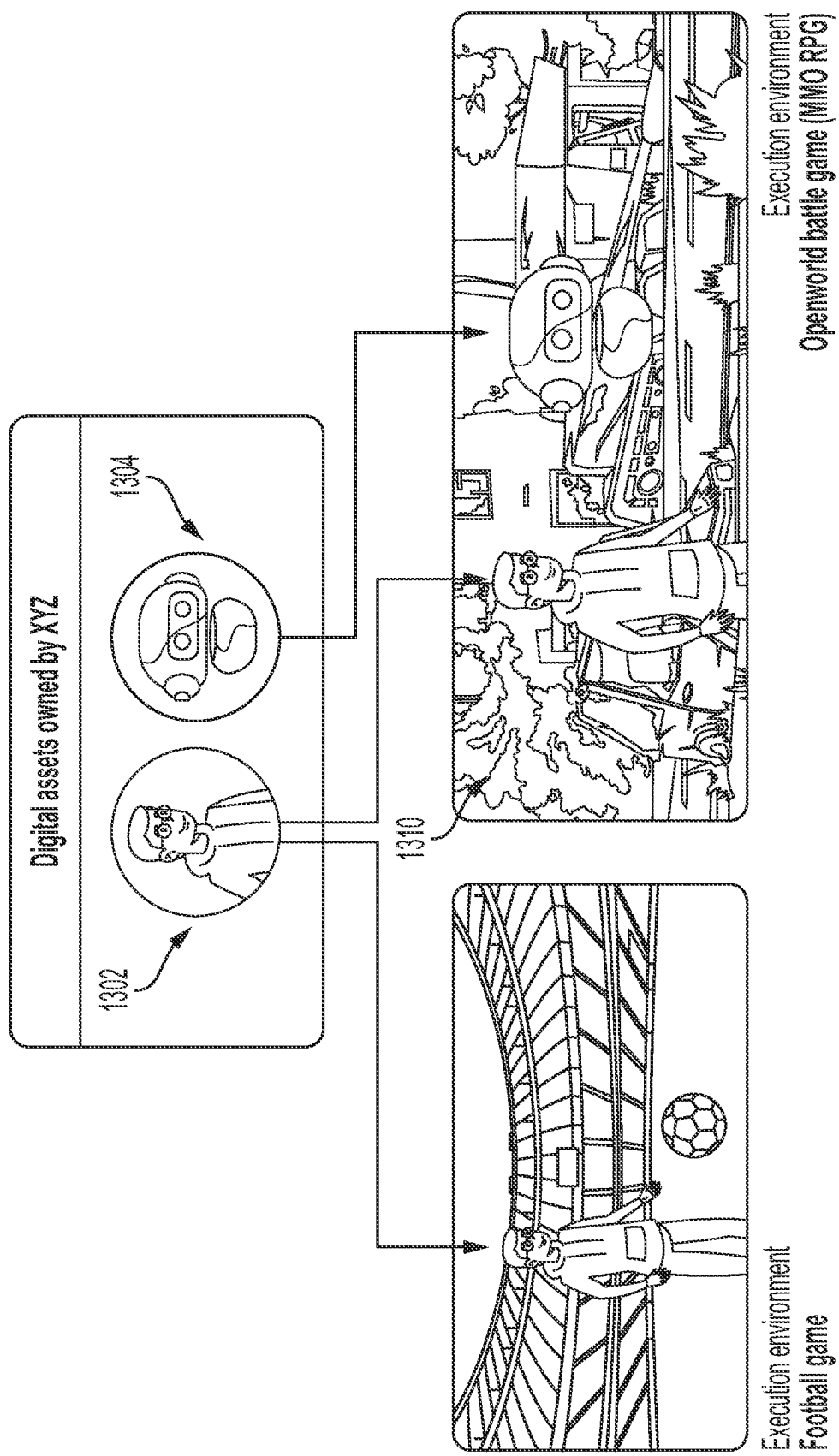
FIG. 13 is an example of two composite units representing avatars to be used in multiple execution environments. In addition, these composite units can be combined.

Further, a composite unit can be applied in a metaverse/Virtual Reality (VR)/Augmented Reality (AR) environment. For example, a composite unit is can represent an avatar (representing a character) within multiple execution environments. The composite unit can represent non-AI aspects of the avatar, such as an image. Further, the composite, can be more complex where and specify the avatar as a 3D asset articulated by different AI models. The composability of composite units described above can be applied to a composite unit representing an Avatar can be augmented with other composite units to add clothing, weapons, characteristics, or the like. For example, one can imagine an scenario where a composite unit of a football player avatar could be dropped into a football game, changing the visual representation of the game character, The same avatar, dropped into an open world battle game (MMO RPG) along with a second composite unit, could compose together to create an enhanced avatar representation that could have unique characteristics, traits, etc. per the rules of the execution environment. FIG. 13 illustrates an example of two composite units, composite unit 1302 and composite unit 1304, representing avatars to be used in multiple execution environments. In addition, these composite units can be combined as shown at 1310.

As noted above, the interface of the composite units allows for the creation of pipelines and systems from multiple complementary composite units. For example, composite units can be used in seriatim and/or parallel to produce pipelines of composite units. Of course, the inputs and outputs of successive sections of the pipeline should substantially match. As a simple example, if the output of a first composite unit in the pipeline is ball speed and ball direction. The composite unit or units connected to the output should accept, as input, ball speed and ball direction In the context AI gamification, interacting with a model is critical. AI models can be defined as composite units that interact with an execution environment (a video game for example) to "train" the execution environment (e.g., add features, configure operating parameters . . . . In general, AI models can be described as a set of matrices that accept a set of inputs to produce a set of outputs. Rather than seeing the concept of "training" as a component of the AI model, the very makeup of the model itself, disclosed implementations can describe "training" as having a function within a particular execution environment, e.g., generating/modifying a ML/AI model. For example, If a composite data unit is saved in correspondence to tokens on a blockchain, a marketplace for semi-fungible, fully interoperable separated training and inference environments, as well as the composite unit(s) that could create such environments, can be created—allowing people to buy, sell, and trade the composite data units in open, decentralized forums.

As noted above, the interface of the composite units allows for the creation of pipelines and systems from multiple complementary composite units. For example, composite units can be used in seriatim and/or parallel to produce pipelines of composite units. Of course, the inputs and outputs of successive sections of the pipeline should substantially match. As a simple example, if the output of a first composite unit in the pipeline is ball speed and ball direction. The composite unit or units connected to the output should accept, as input, ball speed and ball direction In the context AI gamification, interacting with a model is critical. AI models can be defined as composite units that interact with an execution environment (a video game for example) to "train" the execution environment (e.g., add features, configure operating parameters . . . . In general, AI models can be described as a set of matrices that accept a set of inputs to produce a set of outputs. Rather than seeing the concept of "training" as a component of the AI model, the very makeup of the model itself, disclosed implementations can describe "training" as having a function within a particular execution environment, e.g., generating/modifying a ML/AI model. For example, If a composite data unit is saved in correspondence to tokens on a blockchain, a marketplace for semi-fungible, fully interoperable separated training and inference environments, as well as the composite unit(s) that could create such environments, can be created—allowing people to buy, sell, and trade the composite data units in open, decentralized forums.

Figure 14:
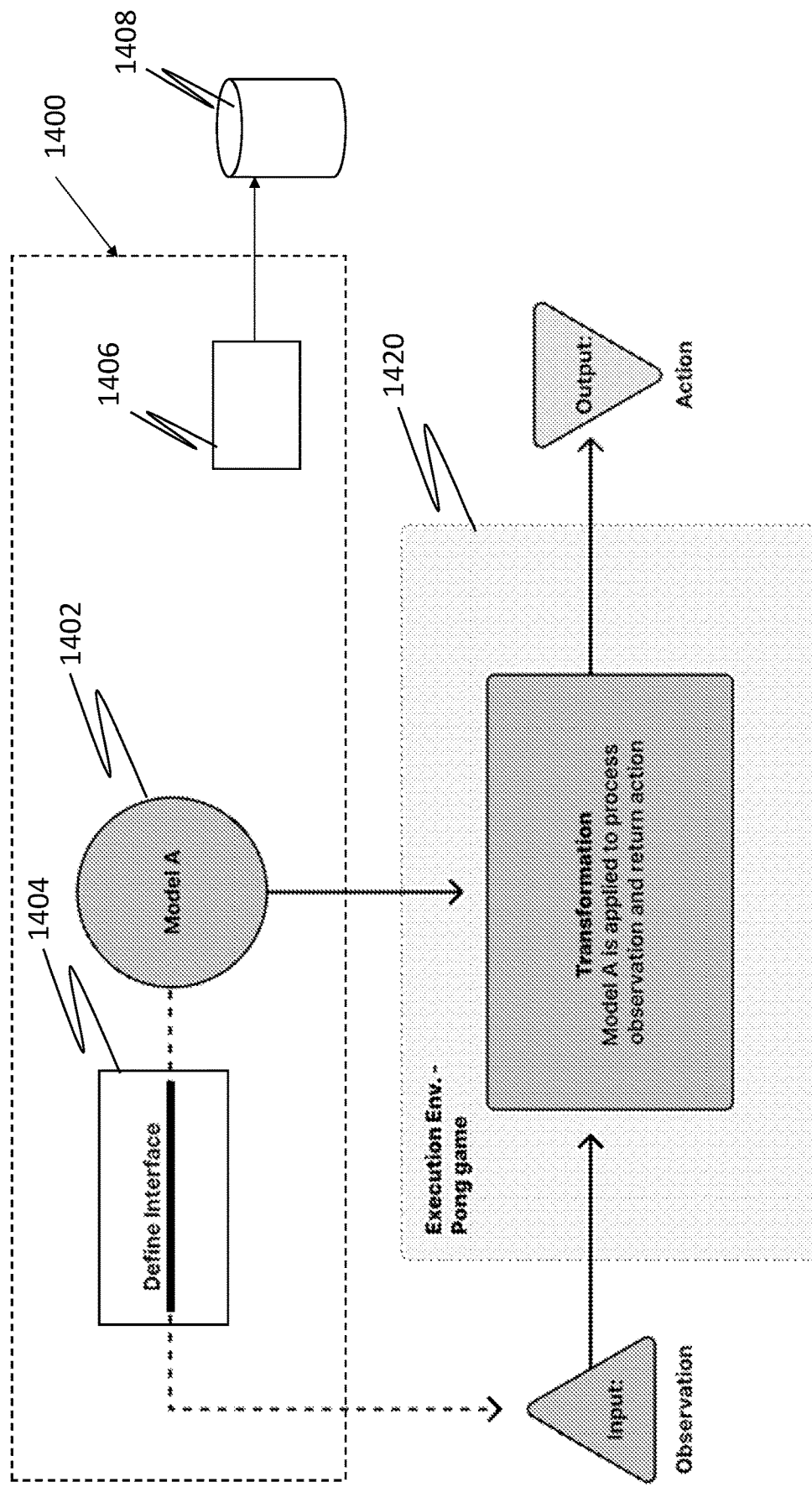
FIG. 14 is an example of a composite unit where the execution data doesn't contain execution code and the interpretation of the execution data is accomplished by the execution environment.

FIG. 14 illustrates another disclosed implementation in which a composite data unit is used to provide a computation model that can be applied in multiple execution environments. As shown in FIG. 14, composite data unit 1400, which can be a data structure recorded on non-transitory computer readable media, includes AI inference model 1402, interface definition 1404 and pointer 1406 which points to a database reference entry associated with the AI model 1402. For example, AI inference model 1402 can specify predetermined operating parameters, whereby the AI model will cause an execution environment (such as PONG™ game 1420) to perform an activity (play of the PONG™ game) based on the predetermined operating parameters. AI inference model 1402 can be applied to process observation (input) and return action (Output) of the execution environment to cause the execution environment to operate in a desired manner. As a simple example, AI model 1402 could add a "spin" feature to the PONG™ game to allow a player to apply spin by moving the racket during impact with the ball to thereby cause the ball to travel along a non-linear path. Other aspects of composite data unit 1300 can be similar to the composite data units described above.

In FIG. 14, AI model 1402 determines how to move the ball given the location and/or movement speed/direction of the two paddles. When interacting with the game, a user selects/submits a model. Then, execution environment 1420 (the PONG™ game), will run the game, calling for the usage of AI model 1402 to describe the movement of one paddle over many iterations. This AI model 1202 is applied to process observation and return action of execution environment 1420.

Figure 15:
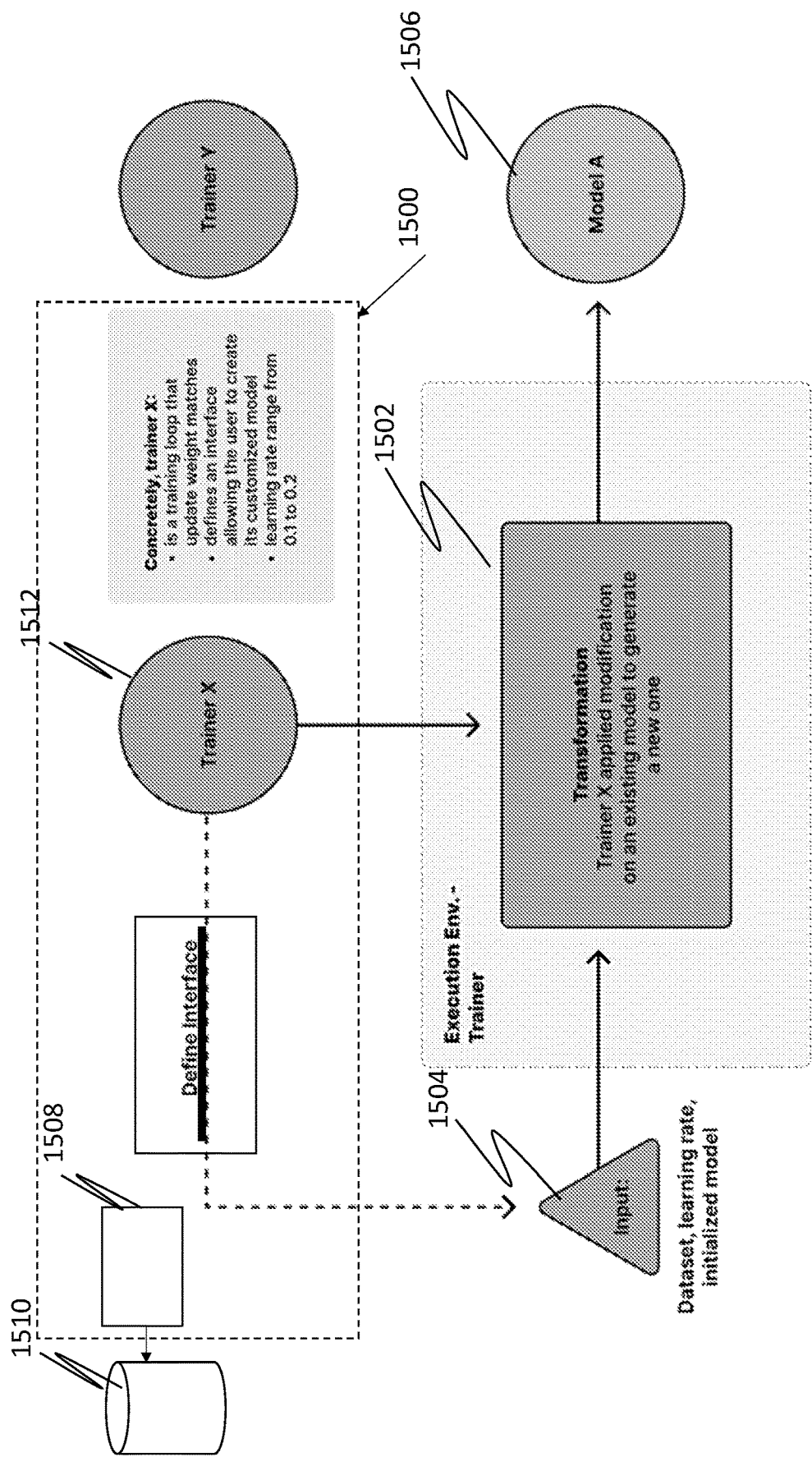
FIG. 15 is an example of two composite units representing avatars to be used in multiple execution environments. In addition, these composite units can be combined.

FIG. 15 illustrates a disclosed implementation in which a "training" composite data unit is interacts with an execution environment. As discussed in greater detail below, the execution environment can be analogized to a gym with all the weights and physical fitness machines. The training composite data unit can be analogized to a human coach giving instructions and monitoring the athletes (AI model) during training. As shown in FIG. 15, composite data unit 1500, which can be a data structure recorded on non-transitory computer readable media, includes an execution environment 1502 (including an AI model), interface definition 1504 and a pointer 1508 which points to a database reference entry associated with the trainer X 1512. Training composite data unit 1502 also includes execution data specifying predetermined tasks and an order in which the predetermined tasks are performed, whereby the execution data will cause the execution environment to direct model 1506 to perform the predetermined tasks in accordance with the order within the execution environment operative to modify the AI model of the execution environment. Again, as an analogy, the composite data unit can be thought of as a coach, and the execution environment is a gym with all the weights and physical fitness machines. It could also contain data for other types of training could happen, like preparing for a specific run, and the like. The composite data unit will consist of executing or directing the model to perform certain tasks in a certain order within the execution environment and the composite data unit will also be responsible for modifying the model running in the execution environment, in accordance with "training" parameters. The execution environment can be distinct from the CDU. An execution environment suitable for a trainer CDU can be, for example the combination of a PONG™ compatible environment with a wrapper around it to support training tasks. The trainer X CDU is a component that can be plugged into the wrapper to define the training tasks.

In implementation of FIG. 15, the pointer to the interface definition can specify an execution environment that includes execution data specifying tasks and an order in which the specified tasks are performed, whereby the execution data causes an AI model to perform the specified tasks in accordance with the order to thereby modify the AI model according to performance the training composite data unit measures.

The process describes in FIG. 15 can be applied one level up to build a "trainer of trainers", where the trainer of trainers composite unit data, once plugged in a suitable execution environment will generate a trainer X 1512. Users can connect to a game using their web3 wallet. The user then selects a player which is a combination of frame, form, brain and memory. Multiple players can be selected to create a team in the case of team play such as football. Two teams are required for a match/game. The game starts and the players are loaded, the game checks to ensure that NFT associated with the combination of frame, form, brain and memory is owned by the user when they enter the arena. The two sides compete to score enough winning points/goals in a specific time period.

The output of this result can be stored on a distributed ledger, such as a blockchain network against the record of the relevant NFTs. This enables an ecosystem of economic incentives and activities to develop around the players and the outcomes of Games. Game, player, and team stats can be displayed in various manners. Users can view an inventory of their frames, forms and brains as well as the makeup of their players and how the stats impact the players. A user interface can be provided to allow players to be modified by attaching a combinations of frames/forms/brains. Users could wager on the outcome of games or rent a team to play a match or borrow a player to upgrade their team.

The platform includes a distributed ledger having a native token to be used for the payments noted herein. The token can be mined using a liquidity mining event. Once a user holds a native token, the user can use the native token to mine (or buy) a pack of a frame/form/brain combination. Packs will have a random chance of spawning a rare component of each. Mining can be based on a fair distribution curve, and a minimum stake can be required to mine a pack. The time it takes to mine can be reduced based on a user's staked amount. This allows early or strong supporters to benefit as well as later or smaller supporters to participate.

To make the game fair even for smaller participants, an increase in stake need not necessarily increase your individual chance of getting a rare attribute upon minting of an NFT. However, larger stakeholders could be able to mine more packs in the same amount of time with respect to smaller stakeholders. Packs can be released in editions and, over time, editions can contain new attributes as the models evolve or some editions may contain limited runs. However, because the performance of a player is determined by its training and experience even a "low" spec character has a chance of developing a winning capability/strategy. The native token can also be used for the payments between providers of GPUs to gyms and users of those gyms. Native tokens can also be used to purchase players from other users, to buy access to an arena, or to purchase cosmetic items or loot boxes for players.

Various known technology platforms and protocols can be used in connection with the disclosed implementations. The NFTs can be minted using the ERC-1155 token standard. Such NFTs are specifically for gaming and enable more efficient trade and transfer on the Ethereum network than is possible through ERC-721 alternatives.

CHAINLINK™ RNG (Random Number Generator) and VRF (Verified Randomness Function) can be used to provide randomness both in game mechanics (such as a coin toss for where the ball starts) and in minting mechanics for rare attributes associated with the NFTs. The Chainlink oracle network can also be used to enable the NFTs to have dynamic attributes which build up during game play. SYLO protocol, an ecosystem made up of digital consumer wallet software, applications, infrastructure & developer tools, can be used for in game chat and marketplace chat as well as for NFT wallets. IPFS can be used for storing the memories associated with an NFT and ensuring the brain in a game is using the correct NFT. UNITY can be used for the game engine.

The specific examples described above relate primarily to video games. However, the disclosed implementations can be applied to various applications and the "player" entity could be, for example, a chat bot (to give an individual personality to an online friend), a personal assistant that is truly personal, and/or a trading bot which acts on behalf of its owner or its community to accomplish transactions in accordance with a dynamic trading strategy. Any task that could be completed by an intelligent automated agent could be accomplished using the disclosed implementations.

Further, a composite unit can be applied in a metaverse/ Virtual Reality (VR)/Augmented Reality (AR) environment. For example, a composite unit is can represent an avatar (representing a character) within multiple execution environments. The composite unit can represent non-AI aspects of the avatar, such as an image. Further, the composite, can be more complex where and specify the avatar as a 3D asset articulated by different AI models. The composability of composite units described above can be applied to a composite unit representing an Avatar can be augmented with other composite units to add clothing, weapons, characteristics, or the like. For example, one can imagine an scenario where a composite unit of a football player avatar could be dropped into a football game, changing the visual representation of the game character, The same avatar, dropped into an open world battle game (MMO RPG) along with a second composite unit, could compose together to create an enhanced avatar representation that could have unique characteristics, traits, etc. per the rules of the execution environment. FIG. 13 illustrates an example of two composite units, composite unit 1302 and composite unit 1304, representing avatars to be used in multiple execution environments. In addition, these composite units can be combined as shown at 1310.

As noted above, the interface of the composite units allows for the creation of pipelines and systems from multiple complementary composite units. For example, composite units can be used in seriatim and/or parallel to produce pipelines of composite units. Of course, the inputs and outputs of successive sections of the pipeline should substantially match. As a simple example, if the output of a first composite unit in the pipeline is ball speed and ball direction. The composite unit or units connected to the output should accept, as input, ball speed and ball direction.

It will be appreciated by those skilled in the art that changes could be made to the disclosed implementations without departing from the broad inventive concept thereof. It is understood, therefore, that this invention is not limited to the disclosed implementations, but it is intended to cover modifications within the spirit and scope of the present invention as defined by the appended claims.

What is claimed:

1. A non-transitory computer readable media for providing a computation model, comprising:
   first execution data specifying predetermined tasks and an order in which the predetermined tasks are performed, whereby the execution data will cause a first execution environment to direct a first Artificial Intelligence (AI) model to perform the predetermined tasks in accordance with the order within the first execution environment;
   an interface definition module including a pointer to an interface definition of a second execution environment, wherein the second execution environment includes second execution data specifying specified tasks and an order in which the specified tasks are performed, whereby the execution data causes a second AI model executing in a second execution environment to perform the specified tasks in accordance with the order to thereby modify the second AI model; and a database pointer including a pointer to a database entry associated with the first execution data.

2. The non-transitory computer readable media of claim 1, wherein the interface definition specifies a finite set of inputs and outputs for the predetermined processing.

3. The non-transitory computer readable media of claim 2, wherein the database pointer points to a token stored on a decentralized ledger.

4. The non-transitory computer readable media of claim 3, wherein the token is a non-fungible token (NFT).

5. The non-transitory computer readable media of claim 2, wherein the database pointer points to a data field in a centralized database.

6. The non-transitory computer readable media of claim 2, wherein the execution data is stored one or more unidimensional matrices.

\* \* \* \* \*